(12) United States Patent
Tani

(10) Patent No.: US 11,983,242 B2
(45) Date of Patent: May 14, 2024

(54) LEARNING DATA GENERATION DEVICE, LEARNING DATA GENERATION METHOD, AND LEARNING DATA GENERATION PROGRAM

(71) Applicant: KABUSHIKI KAISHA TOSHIBA, Tokyo (JP)

(72) Inventor: Hiroaki Tani, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 183 days.

(21) Appl. No.: 17/652,568

(22) Filed: Feb. 25, 2022

(65) Prior Publication Data

US 2022/0343112 A1 Oct. 27, 2022

(30) Foreign Application Priority Data

Apr. 26, 2021 (JP) .................................. 2021-074232

(51) Int. Cl.
*G06F 18/214* (2023.01)
*G06F 18/2113* (2023.01)
*G06V 10/62* (2022.01)

(52) U.S. Cl.
CPC ........ *G06F 18/214* (2023.01); *G06F 18/2113* (2023.01); *G06V 10/62* (2022.01)

(58) Field of Classification Search
CPC .... G06F 18/214; G06F 18/2113; G06V 10/62
See application file for complete search history.

(56) References Cited

U.S. PATENT DOCUMENTS

| 10,210,391 | B1 | 2/2019 | Jones et al. |
| 2019/0325275 | A1* | 10/2019 | Lee ................. G06V 30/19167 |
| 2021/0115862 | A1 | 4/2021 | Fujita |

FOREIGN PATENT DOCUMENTS

| JP | 2020-530162 A | 10/2020 |
| JP | 2021-63486 A | 4/2021 |

OTHER PUBLICATIONS

Vinayavekhin et al, "Focusing on What is Relevant: Time-Series Learning and Understanding using Attention" (published at https://arxiv.org/abs/1806.08523 on Jun. 2018).*

Sijie Song et al., "An End-to-End Spatio-Temporal Attention Model for Human Action Recognition from Skeleton Data," AAAI 2017 arXiv:1611.06067v1 [cs.CV], 7 pages (2016).

Dimitri Zhukov et al., "Learning Actionness via Long-range Temporal Order Verification," Euro. Conf. on Computer Vision (ECCV), 17 pages (2020).

* cited by examiner

*Primary Examiner* — Casey L Kretzer
(74) *Attorney, Agent, or Firm* — Finnegan, Henderson, Farabow, Garrett & Dunner, LLP

(57) ABSTRACT

A learning data generation device includes an acquisition unit, an attention level derivation unit, and a selection unit. The acquisition unit acquires sequence data including a plurality of frames that include a target and are consecutive in a sequence. The attention level derivation unit derives an attention level that is feature data in a time axis direction of each of the plurality of frames included in the sequence data by using a trained model. The selection unit selects one or a plurality of frames included in the sequence data as a learning frame to be used for learning data based on the attention level.

17 Claims, 17 Drawing Sheets

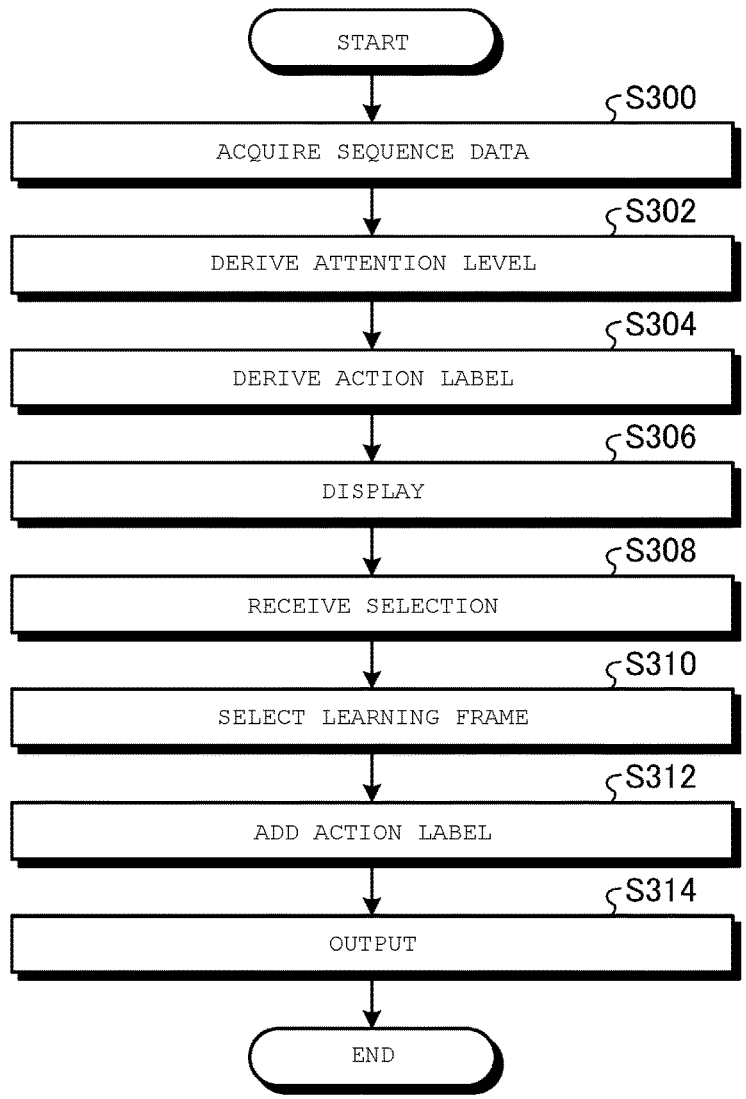

LEARNING DATA GENERATION DEVICE, LEARNING DATA GENERATION METHOD, AND LEARNING DATA GENERATION PROGRAM

CROSS-REFERENCE TO RELATED APPLICATIONS

This application is based upon and claims the benefit of priority from Japanese Patent Application No. 2021-074232, filed Apr. 26, 2021, the entire contents of which are incorporated herein by reference.

FIELD

Embodiments described herein relate generally to a learning data generation device, a learning data generation method, and a learning data generation program.

BACKGROUND

A learning model for action recognition of targets such as people may be generated. For example, among a plurality of frames configuring sequence data, a frame including a target detected through object detection may be used as learning data.

However, in the related art, a frame including a target may be simply selected regardless of an action of the target. Thus, in the related art, effective learning data for target action recognition may be not provided.

Examples of related art include PCT Japanese Patent Publication No. 2020-530162, and An End-to-End Spatio-Temporal Attention Model for Human Action Recognition from Skeleton Data [Sijie et al. AAAI 2017].

DESCRIPTION OF THE DRAWINGS

FIG. 14 is a flowchart showing information processing executed by the learning data generation device.

FIG. 15 is a schematic diagram showing a data structure of an action label DB.

DETAILED DESCRIPTION

The present disclosure provides a learning data generation device, a learning data generation method, and a learning data generation program capable of providing effective learning data for action recognition of a target.

In general, according to one embodiment, a learning data generation device includes an acquisition unit, an attention level derivation unit, and a selection unit. The acquisition unit acquires sequence data including a plurality of frames that include a target and are consecutive in a sequence. The attention level derivation unit derives an attention level that includes feature data in a time axis direction of each of the plurality of frames included in the sequence data by using a trained model. The selection unit selects one or a plurality of frames included in the sequence data as a learning frame to be used for learning data based on the attention level.

The learning data generation device, the learning data generation method, and the learning data generation program will be described in detail with reference to the accompanying drawings.

First Embodiment

Figure 1:
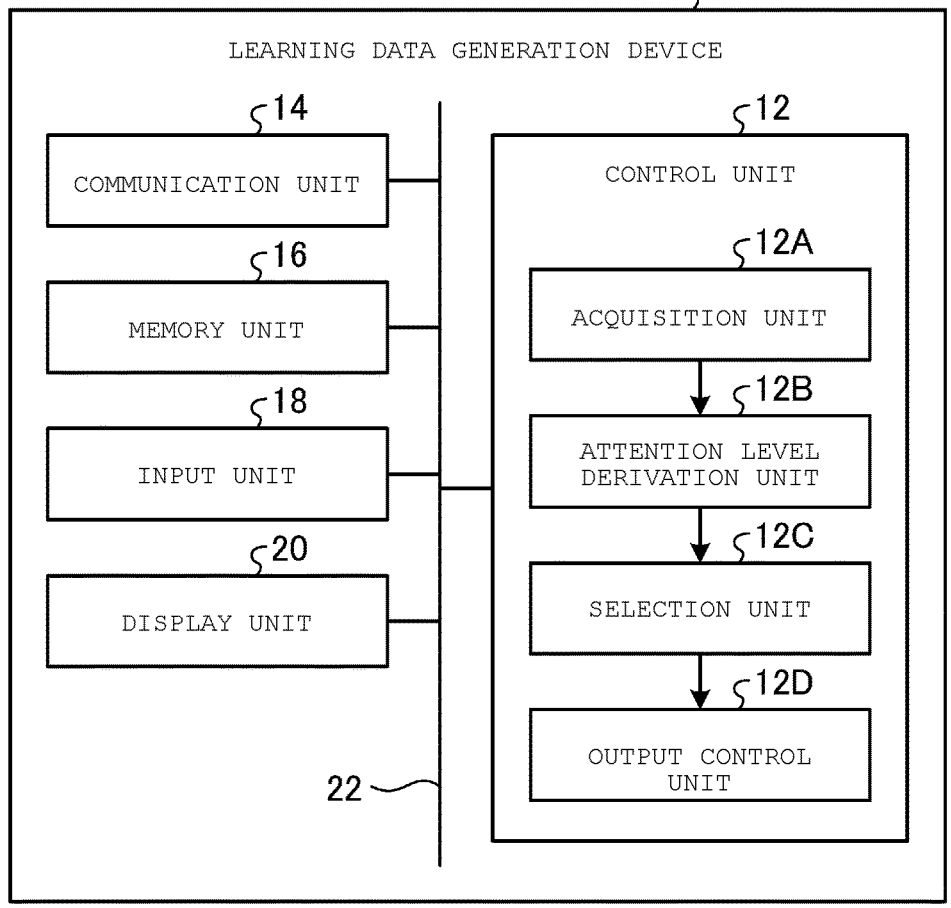
FIG. 1 is a block diagram showing a learning data generation device.

FIG. 1 is a block diagram showing an example of a configuration of a learning data generation device 10A of the present embodiment.

The learning data generation device 10A is an example of a learning data generation device 10. The learning data generation device 10 may be an information processing device that generates learning data.

The learning data may be data used for learning by a learning model related to action recognition of a target.

The target may be a target of action recognition. The target may be a moving object. The moving object may be, for example, a person, an animal, a car, a ship, a robot, a drone, or the like. In the present embodiment, a case where a target is a person will be described as an example.

The action may be a motion of a target. The action recognition means recognizing an action of a target.

The learning model related to action recognition of a target may be a learning model that receives a frame as input and outputs information regarding the action recognition of the target. The learning model may be a deep learning model formed of a neural network such as a convolutional neural network (CNN), a graph convolutional network (GCN), or a recurrent neural network (RNN).

The frame may be information regarding a target. Details of the frame will be described later. The information regarding the action recognition of the target may be, for example, feature data of the frame, feature data of the target included in the frame, or a class classification result and a class label in which a plurality of frames are classified by using the feature data. A learning model that outputs class classification results and class labels will also be referred to as a class classifier.

The learning data generation device 10A generates a learning frame. The learning frame may be a frame selected as learning data used for learning by a learning model.

The learning data generation device 10A may include a control unit 12, a communication unit 14, a memory unit 16, an input unit 18, and a display unit 20. The control unit 12, the communication unit 14, the memory unit 16, the input unit 18, and the display unit 20 may be communicatively connected to each other via a bus 22.

The communication unit 14 may be a communication interface that communicates with an external information processing device via a network or the like.

The memory unit 16 may store various types of data. The memory unit 16 may be, for example, a semiconductor memory element such as a random access memory (RAM) or a flash memory, a hard disk, or an optical disk. The memory unit 16 may be a storage device provided outside the learning data generation device 10A. The memory unit 16 may be a storage medium that downloads a program or various types of information via a local area network (LAN), the Internet, or the like and stores or temporarily stores the program or the various types of information.

The input unit 18 may receive various operations from a user. The input unit 18 may be, for example, a keyboard, a mouse, a pointing device, or a microphone.

The display unit 20 displays various types of information. The display unit 20 may be, for example, a display or a projection device. The display unit 20 and the input unit 18 may be integrally configured to form a touch panel.

At least one of the memory unit 16 and the control unit 12 may be mounted on an external information processing device such as a server device connected via a network and the communication unit 14. At least one of functional units that will be described later included in the control unit 12 may be mounted on an external information processing device such as a server device connected to the control unit 12 via a network and the communication unit 14.

Next, the control unit 12 will be described in detail. The control unit 12 executes various types of information processing in the learning data generation device 10A.

The control unit 12 may include an acquisition unit 12A, an attention level derivation unit 12B, a selection unit 12C, and an output control unit 12D.

The acquisition unit 12A, the attention level derivation unit 12B, the selection unit 12C, and the output control unit 12D may be implemented by, for example, one or a plurality of processors. For example, each of the above units may be implemented by causing a processor such as a central processing unit (CPU) to execute a program, that is, by software. Alternatively, each of the above units may be implemented by a processor such as a dedicated IC, that is, by hardware. As a further alternative, each of the above units may be implemented by using software and hardware in combination. When a plurality of processors are used, each processor may implement one of the respective units, or may implement two or more of the respective units.

The acquisition unit 12A acquires sequence data. The acquisition unit 12A acquires sequence data from a sensor that detects a target. The sensor may be, for example, a sensing device such as an imaging device or an accelerometer. The acquisition unit 12A may acquire sequence data from the memory unit 16. The acquisition unit 12A may acquire sequence data from an external information processing device or the like via the communication unit 14.

The sequence data may be data including a plurality of frames consecutive in a sequence. The sequence data may be at least one of, for example, sequence data of an image, sequence data of a target region of a target included in an image, sequence data of skeleton information representing a joint position of a target, and sequence data of acceleration of a target. As described above, the frame may be information regarding a target. Specifically, the frame may be a still image including the target, skeleton information of the target, acceleration of the target, or the like.

The sequence data of the image may be, for example, moving image data. When the sequence data is moving image data, for example, the acquisition unit 12A may acquire sequence data from an imaging device that captures a moving image. When the moving image data is acquired as sequence data, the acquisition unit 12A acquires sequence data in which a still image or a target region of each target included in the still image may be a frame. For example, an external information processing device detects a target included in a still image by using detection techniques such as object detection and general object tracking, and generates sequence data in which a target region that is a region of the detected target may be a frame. The target region may be represented by, for example, a position, a size, or a range of the target in the still image. The acquisition unit 12A may acquire sequence data from an information processing device.

When sequence data of the skeleton information or the acceleration is acquired, the acquisition unit 12A may acquire sequence data in which skeleton information or acceleration of a target may be a frame. For example, an external information processing device may extract skeleton information of a target included in a still image by using a well-known image processing technique, and generate sequence data in which the extracted skeleton information is a frame. For example, the external information processing device may measure acceleration of a target included in a still image by using a well-known image processing technique or the like, and generate sequence data in which the measured acceleration of the target is a frame. The acquisition unit 12A may acquire sequence data from such information processing devices.

The acquisition unit 12A may acquire sequence data in which a target region is a frame by detecting the target region included in a still image by using detection techniques such as target detection and general object tracking. The acquisition unit 12A may acquire sequence data in which skeleton information or acceleration of a target is a frame by extracting the skeleton information or the acceleration of the target included in a still image using a well-known image processing technique.

The attention level derivation unit 12B may derive an attention level of each of a plurality of frames included in the sequence data acquired by the acquisition unit 12A by using a trained model.

The attention level may be feature data of the frame in a time axis direction. Therefore, the attention level may become higher as the target included in the frame appears to be acting. That is, the attention level may be a value indicating the degree of importance in recognizing an action of the target included in the frame.

The attention level may be feature data in the time axis direction of the target included in the frame. In the present embodiment, an aspect in which the attention level is feature data of the frame in the time axis direction will be described as an example.

The trained model may be a learning model, which has completed learning, that receives a frame as input and outputs information regarding action recognition of a target. The trained model may be a deep learning model formed of a neural network such as a CNN, a GCN, or an RNN. The trained model may be the same model as the above-described learning model that uses the learning frame as learning data, or may be a different model.

As parameters of the trained model, those learned in advance by using learning data for action recognition such as Kinetics and NTU RGB+D may be used. Sequence data used for pre-learning by the trained model may be sequence data acquired by the acquisition unit 12A, or may be sequence data different from such sequence data. That is, the trained model may be a learning model that has been trained in advance by using the sequence data acquired by the acquisition unit 12A or other sequence data different from such sequence data.

The information regarding the action recognition of the target output from the trained model may be, for example, feature data of a frame, feature data of a target included in a frame, or a class classification result and an action label in which a plurality of frames may be classified by using the feature data. The action label may be a class label added to a class of an action. The action label may be information indicating an action of a target included in a frame. Specifically, for example, the action label may be, but is not limited to, "wandering" indicating that the target moves around in various directions, "looking around" indicating that the target's line of sight sways, and the like.

Figure 2:
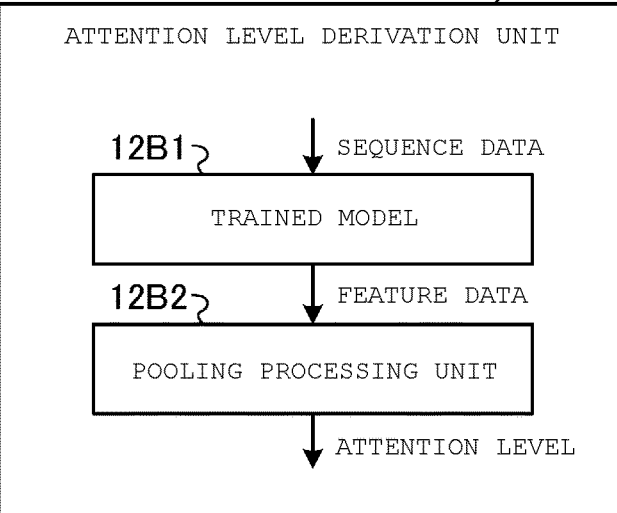
FIG. 2 is a block diagram showing a functional configuration of an attention level derivation unit.

FIG. 2 is a block diagram showing an example of a functional configuration of the attention level derivation unit 12B. The attention level derivation unit 12B may include a trained model 12B1 and a pooling processing unit 12B2.

The attention level derivation unit 12B may derive feature data of each frame from the trained model 12B1 by inputting sequence data to the trained model 12B1. The attention level derivation unit 12B may derive a vector value in the time axis direction in the feature data derived from the trained model 12B1 as an attention level.

Figure 3:
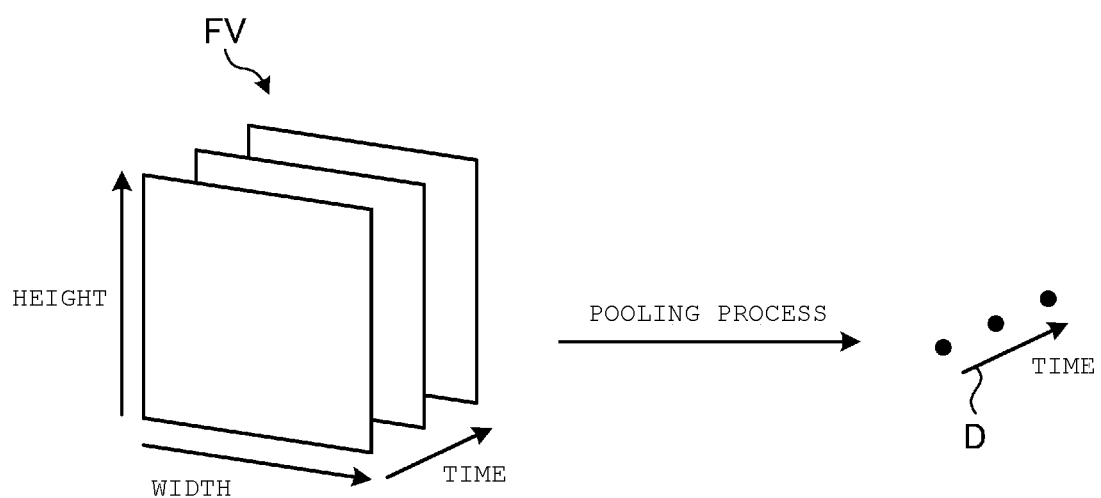
FIG. 3 is an explanatory diagram showing derivation of an attention level.

FIG. 3 is an explanatory diagram showing an example of attention level derivation by the attention level derivation unit 12B. For example, a case where the trained model 12B1 is a model that receives sequence data as input and outputs a class classification result of a frame and an action label is assumed and will be described. That is, a case where the trained model 12B1 may be a class classifier is assumed. The attention level derivation unit 12B inputs sequence data to the trained model 12B1. The trained model 12B1 may calculate feature data of each frame in the process of output of a result. The attention level derivation unit 12B may acquire this feature data.

Specifically, for example, the trained model 12B1 may derive a plurality of tensors from each of the frames of the sequence data by repeating a well-known convolution operation or the like. The attention level derivation unit 12B may extract one or a plurality of tensors for each frame from a layer before a final layer from which the trained model 12B1 outputs the result. The attention level derivation unit 12B may derive feature data of the frame from the one or plurality of tensors extracted for each frame. When a plurality of tensors are extracted for one frame, the attention level derivation unit 12B may derive the feature data of the frame after performing an integration process such as adding the extracted tensors.

The derived feature data may be represented by a multidimensional vector. For example, as shown in FIG. 3, the feature data of the frame (refer to the reference sign FV in FIG. 3) may be represented by a multidimensional vector of time, height, and width.

The pooling processing unit 12B2 may derive an attention level by converting the feature data represented by the multidimensional vector into a one-dimensional vector. Specifically, the pooling processing unit 12B2 may perform a pooling process to convert the feature data represented by the multidimensional vector into an attention level that may be one-dimensional feature data in only the time axis direction (refer to the reference sign D in FIG. 3). That is, the pooling processing unit 12B2 may derive the attention level that may be one-dimensional feature data in the time axis direction by removing feature data of dimensions other than the time axis direction. For the pooling process, global average pooling (which takes an average value along dimensions to be removed), max pooling (which takes a maximum value), or the like may be applied. The attention level that may be feature data in the time axis direction may become higher as a target included in the frame appears to be acting. That is, the attention level may be a value indicating the degree of importance in recognizing an action of the target included in the frame.

Referring to FIG. 1 again, the description will be continued. The selection unit 12C may select one or a plurality of frames included in the sequence data as learning frames to be used for learning data, based on the attention level derived by the attention level derivation unit 12B.

Specifically, the selection unit 12C may select one or a plurality of frames included in the sequence data as learning frames based on at least one of a magnitude of the attention level and an amount of change in the attention level between frames consecutive in a sequence.

Specifically, the selection unit 12C may select, as a learning frame, a frame from among a set of frames comprising at least one of: a predetermined number of frames in descending order of attention levels, a predefined ratio of frames in descending order of attention levels, a frame in a period from a change point at the beginning of an increase in an attention level to a change point at the end of a decrease therein, a frame in which an amount of change in an attention level may be equal to or more than a threshold value, or a frame having the highest attention level and a predetermined number of frames consecutive to the frame in a sequence.

Conditions for selecting a learning frame may be set in advance. Selection conditions may be appropriately changed according to, for example, an operation instruction given by a user to the input unit 18.

FIGS. 4A to 4D are explanatory diagrams of an example of selection of a learning frame by the selection unit 12C. In FIGS. 4A to 4D, a horizontal axis indicates a frame number. A vertical axis indicates an attention level. The frame number may be a numerical value assigned to be a consecutive number when a plurality of frames configuring sequence data are arranged in sequence order. The frame number may be any information that can uniquely identify a frame. In the present embodiment, a mode in which frame numbers are consecutive numbers in sequence order will be described as an example.

Figure 4A:
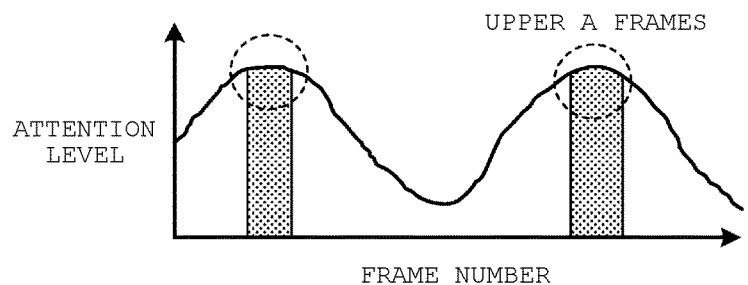
FIG. 4A is an explanatory diagram showing selection of a learning frame.

FIG. 4A is an explanatory diagram showing an example in which a predetermined number of frames are selected in descending order of attention levels. For example, the selection unit 12C may select upper A frames as learning frames in descending order of attention levels among a plurality of frames included in sequence data. For example, A may be an integer of 1 or greater and may be a numerical value less than the number of frames included in the sequence data.

Figure 4B:
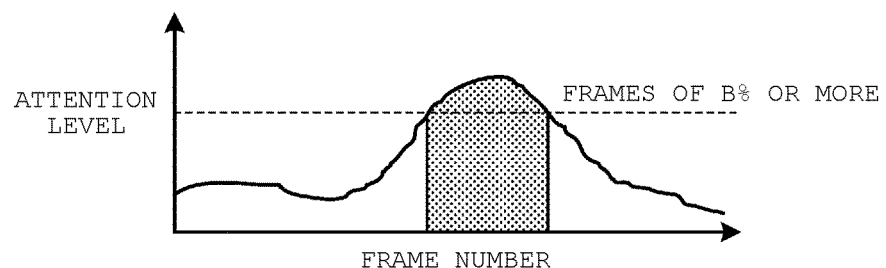
FIG. 4B is an explanatory diagram showing selection of a learning frame.

FIG. 4B is an explanatory diagram showing an example in which a predefined ratio of frames are selected in descending order of attention levels. For example, the selection unit 12C may divide an attention level of each of the plurality of frames included in the sequence data by the maximum value among the attention levels of the plurality of frames. Through this division, the selection unit 12C normalizes the attention level of each of the plurality of frames included in the sequence data. The selection unit 12C may select, among the plurality of frames included in the sequence data, a frame having a normalized attention level of B % or more as a learning frame. For example, B may be a real number greater than 0 and smaller than 100.

Figure 4C:
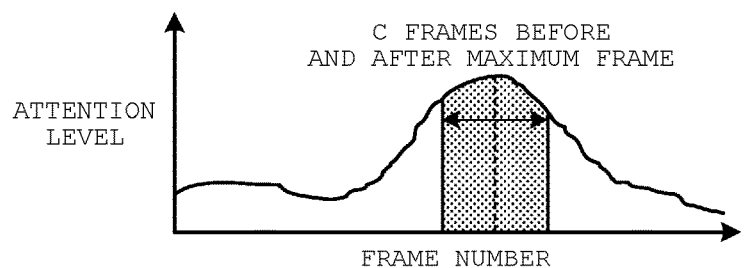
FIG. 4C is an explanatory diagram showing selection of a learning frame.

FIG. 4C is an explanatory diagram showing an example in which a frame having the highest attention level and a predetermined number of frames consecutive to the frame in a sequence are selected. For example, the selection unit 12C may select one frame having the highest attention level or C frames consecutive before and after the frame as learning frames among the plurality of frames included in the sequence data. The term "frames consecutive before and after the frame" means that the frames are consecutive on the upstream side and the downstream side in the sequence direction. For example, C may be an integer of 1 or greater and may be a numerical value less than a number obtained by subtracting 1 from the number of frames included in the sequence data.

Figure 4D:
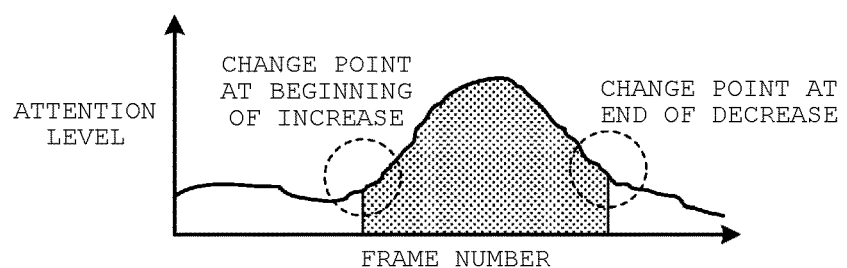
FIG. 4D is an explanatory diagram showing selection of a learning frame.

FIG. 4D is an explanatory diagram showing an example in which a frame in a period from a change point at the beginning of an increase in an attention level to a change point at the end of a decrease therein may be selected. For example, the selection unit 12C may select a frame in the period from a change point at the beginning of an increase in an attention level to a change point at the end of a decrease therein as a learning frame among the plurality of frames included in the sequence data. The change point may be an inflection point calculated from the second derivative or a point where a slope calculated from the first derivative may be equal to or more than a threshold value.

The selection unit 12C may select, among the plurality of frames included in the sequence data, a frame in which an amount of change in the attention level may be equal to or more than a threshold value as a learning frame. The threshold value may be set in advance. The threshold value may be changed according to, for example, an operation instruction given by a user to the input unit 18.

When the selection unit 12C selects a plurality of frames as learning frames, the selection unit 12C may select a plurality of frames consecutive in a sequence, or may select a plurality of non-adjacent intermittent frames satisfying any of the above conditions.

Referring to FIG. 1 again, the description will be continued. The selection unit 12C outputs the selected learning frame to the output control unit 12D.

The selection unit 12C may add an action label to the selected learning frame. For example, a case may be assumed in which the trained model 12B1 used in the attention level derivation unit 12B may be a class classifier that receives sequence data as input and outputs a class classification result of a frame and an action label. In this case, the selection unit 12C may add, to the selected learning frame, an action label derived from the trained model 12B1, corresponding to the learning frame. Alternatively, an action label prepared sequence in advance may be added.

In this case, the action label may be automatically added to the learning frame without any operation by a user.

The output control unit 12D outputs the learning frame received from the selection unit 12C. For example, the output control unit 12D may output the learning frame to at least one of the memory unit 16, the attention level derivation unit 12B, and an external information processing device via the communication unit 14.

For example, the output control unit 12D may store the learning frame as learning data in the memory unit 16. The learning frame stored in the memory unit 16 may be used, for example, for learning by a learning model for action recognition of a target and a representative image of sequence data. The representative image may be referred to as a thumbnail.

The output control unit 12D may transmit the learning frame to an external information processing device via the communication unit 14. The output control unit 12D may output the learning frame to the attention level derivation unit 12B. In this case, the attention level derivation unit 12B may further subject the trained model 12B1 to learning by using the learning frame received from the output control unit 12D as learning data.

When the output control unit 12D receives the learning frame and the action label from the selection unit 12C, the output control unit 12D may output the learning frame and the action label in correlation with each other.

The output control unit 12D may output the learning frame in correlation with at least one of the action label and additional information derived from the learning frame. The additional information may be information regarding the learning frame. For example, the additional information may be information indicating a target region of a target, skeleton information of the target, acceleration of the target, or the like that may be included in the learning frame. The output control unit 12D may acquire such additional information from the acquisition unit 12A and output the additional information in correlation with the learning frame.

Next, an example of information processing executed by the learning data generation device 10A of the present embodiment will be described.

Figure 5:
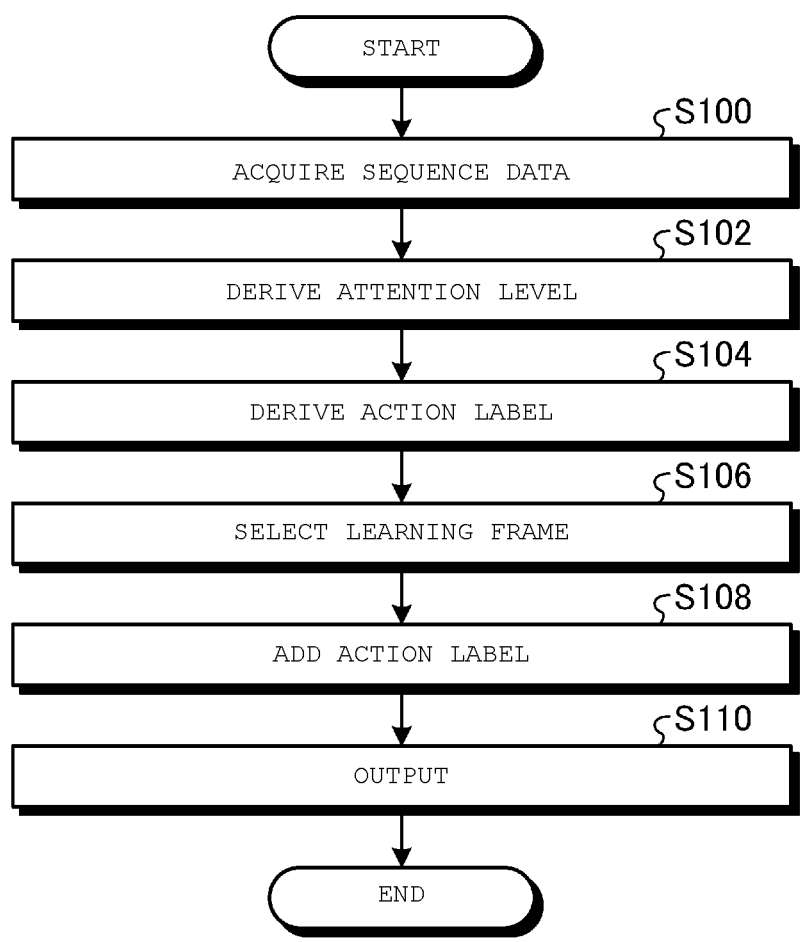
FIG. 5 is a flowchart showing information processing executed by the learning data generation device.

FIG. 5 is a flowchart showing an example of information processing executed by the learning data generation device 10A of the present embodiment.

The acquisition unit 12A acquires sequence data (step S100). The attention level derivation unit 12B may derive an attention level of each of a plurality of frames included in the sequence data acquired in step S100 by using the trained model 12B1 (step S102). The attention level derivation unit 12B may derive an action label of each of the plurality of frames included in the sequence data acquired in step S100 by using the trained model 12B1 (step S104).

The selection unit 12C may select one or a plurality of frames included in the sequence data acquired in step S100 as learning frames to be used for learning data, based on the attention level derived in step S102 (step S106).

The selection unit 12C may add the action label derived in step S104 to the learning frame selected in step S106 (step S108).

The output control unit 12D outputs the learning frame selected in step S106 and the action label added in step S108 to the memory unit 16 or the like in correlation with each other (step S110). This routine is finished.

As described above, the learning data generation device 10A of the present embodiment may include the acquisition unit 12A, the attention level derivation unit 12B, and the selection unit 12C. The acquisition unit 12A may acquire sequence data including a plurality of frames including a target and consecutive in a sequence. The attention level derivation unit 12B may use the trained model 12B1 to derive an attention level that may be feature data in the time axis direction of each of the plurality of frames included in the sequence data. The selection unit 12C may select one or a plurality of frames included in the sequence data as learning frames to be used for the learning data, based on the attention level.

As described above, the learning data generation device 10A of the present embodiment may select one or a plurality of frames included in the sequence data based on the attention level that may be feature data in the time axis direction of each of the plurality of frames included in the sequence data as learning frames.

Therefore, the learning data generation device 10A of the present embodiment can select a frame corresponding to the attention level that may be feature data in the time axis direction that changes depending on an action of a target, as a learning frame and provide the frame as learning data.

Therefore, the learning data generation device 10A of the present embodiment can provide effective learning data for action recognition of the target.

The attention level may be feature data in the time axis direction. Since the attention level may be feature data in the time axis direction, a value thereof may become greater as a target included in a frame appears to be acting. That is, the attention level may be a value indicating the degree of importance in recognizing an action of the target included in the frame. In the learning data generation device 10A of the present embodiment, a frame in which a target may be acting is selected as learning data from among the plurality of frames included in the sequence data by using the attention level. Thus, the learning data generation device 10A may select, as a learning frame, a frame obtained by excluding a frame irrelevant to an action of the target from the plurality of frames included in the sequence data.

Therefore, in addition to the above effects, the learning data generation device 10A of the present embodiment can remove frames unnecessary for learning and provide learning frames effective to learning as learning data. Since the learning data generation device 10A of the present embodiment can provide a learning frame capable of effectively checking an action of a target, it is possible to effectively assist in monitoring work and the like.

The learning data generation device 10A of the present embodiment may use an attention level to select a frame in which a target may be acting from among a plurality of frames included in sequence data as a learning frame. Therefore, it is possible to provide learning data applicable to a learning model that uses data of a small number of frames as learning data.

The learning data generation device 10A of the present embodiment may use the trained model 12B1 that may be a learning model having completed learning to derive an attention level of a frame included in sequence data. That is, the learning data generation device 10A of the present embodiment uses an existing learning model and uses the acquired sequence data without performing any special processing thereon for data used therein. Therefore, in the present embodiment, in addition to the above effects, it is possible to provide the highly versatile learning data generation device 10A.

In the learning data generation device 10A of the present embodiment, the selection unit 12C may select, as a learning frame, one or a plurality of frames included in sequence data based on a magnitude of an attention level and an amount of change in the attention level between frames consecutive in a sequence.

As described above, the learning data generation device 10A of the present embodiment may select the learning frame based on the magnitude of the attention level and the amount of change. Therefore, in addition to the above effects, the learning data generation device 10A of the present embodiment can automatically extract and select a frame in which a target is acting.

The sequence data may be at least one of sequence data of an image, sequence data of a target region of a target included in an image, sequence data of skeleton information representing a joint position of a target, and sequence data of acceleration of a target.

As described above, in the learning data generation device 10A of the present embodiment, various sequence data such as skeleton information and acceleration may be used without being limited to sequence data of images such as moving images. Thus, in addition to the above effects, the learning data generation device 10A of the present embodiment can provide learning data applicable to learning models used in various environments. The learning data generation device 10A of the present embodiment can select a learning frame by using various pieces of sequence data with an attention level robust to environmental changes.

A target may be any target of action recognition, and is not limited to a person. As described above, the target may be specifically a moving object such as a person, an animal, a car, a ship, a robot, or a drone.

Therefore, the learning data generation device 10A of the present embodiment can be applied not only to a person but also to various moving objects such as animals and robots, and can thus be applied to a wide range of applications.

In the learning data generation device 10A of the present embodiment, the output control unit 12D outputs the selected learning frame to the memory unit 16, the external information processing device, the attention level derivation unit 12B, and the like.

Thus, the learning data generation device 10A of the present embodiment can provide a selected learning frame for learning by the learning model, checking sequence data, and the like.

Second Embodiment

In the present embodiment, an aspect in which a frame selected by a user may be received and the received frame may be selected as a learning frame will be described.

Figure 6:
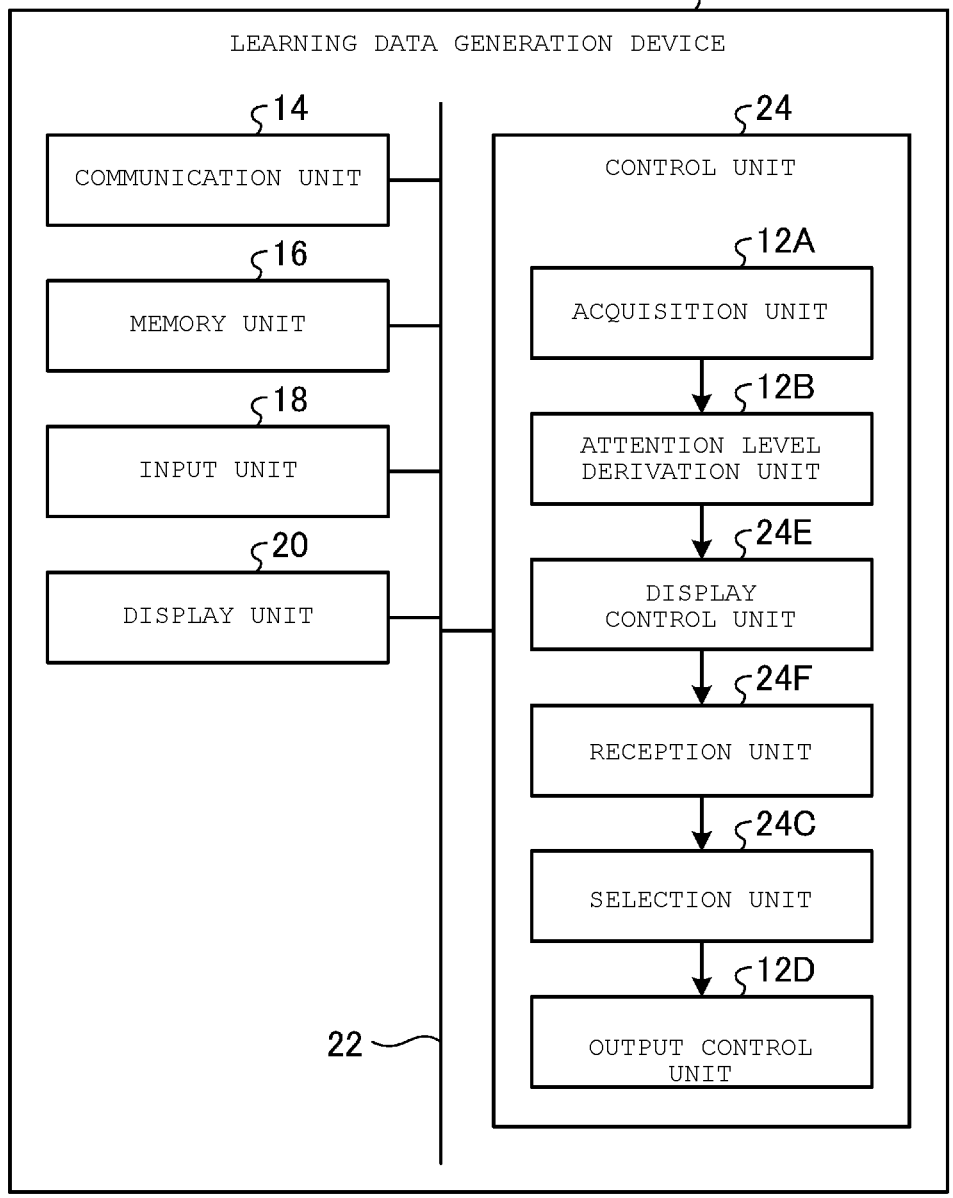
FIG. 6 is a block diagram showing a learning data generation device.

FIG. 6 is a block diagram showing an example of a learning data generation device 10B of the present embodiment. The learning data generation device 10B is an example of the learning data generation device 10.

In the learning data generation device 10B of the present embodiment, the same reference numerals are given to the same elements as those of the learning data generation device 10A of the above embodiment, and detailed description thereof will be omitted.

The learning data generation device 10B may include a control unit 24, a communication unit 14, a memory unit 16, an input unit 18, and a display unit 20. The control unit 24, the communication unit 14, the memory unit 16, the input unit 18, and the display unit 20 may be communicatively connected to each other via a bus 22. The learning data generation device 10B is the same as the learning data generation device 10A except that the control unit 24 is provided instead of the control unit 12.

The control unit 24 executes various types of information processing in the learning data generation device 10B.

The control unit 24 may include an acquisition unit 12A, an attention level derivation unit 12B, a display control unit 24E, a reception unit 24F, a selection unit 24C, and an output control unit 12D. The acquisition unit 12A, the attention level derivation unit 12B, and the output control unit 12D may be the same as those in the above embodiment.

The display control unit 24E may display a display screen including a frame included in sequence data and an attention level of the frame on the display unit 20.

Figure 7:
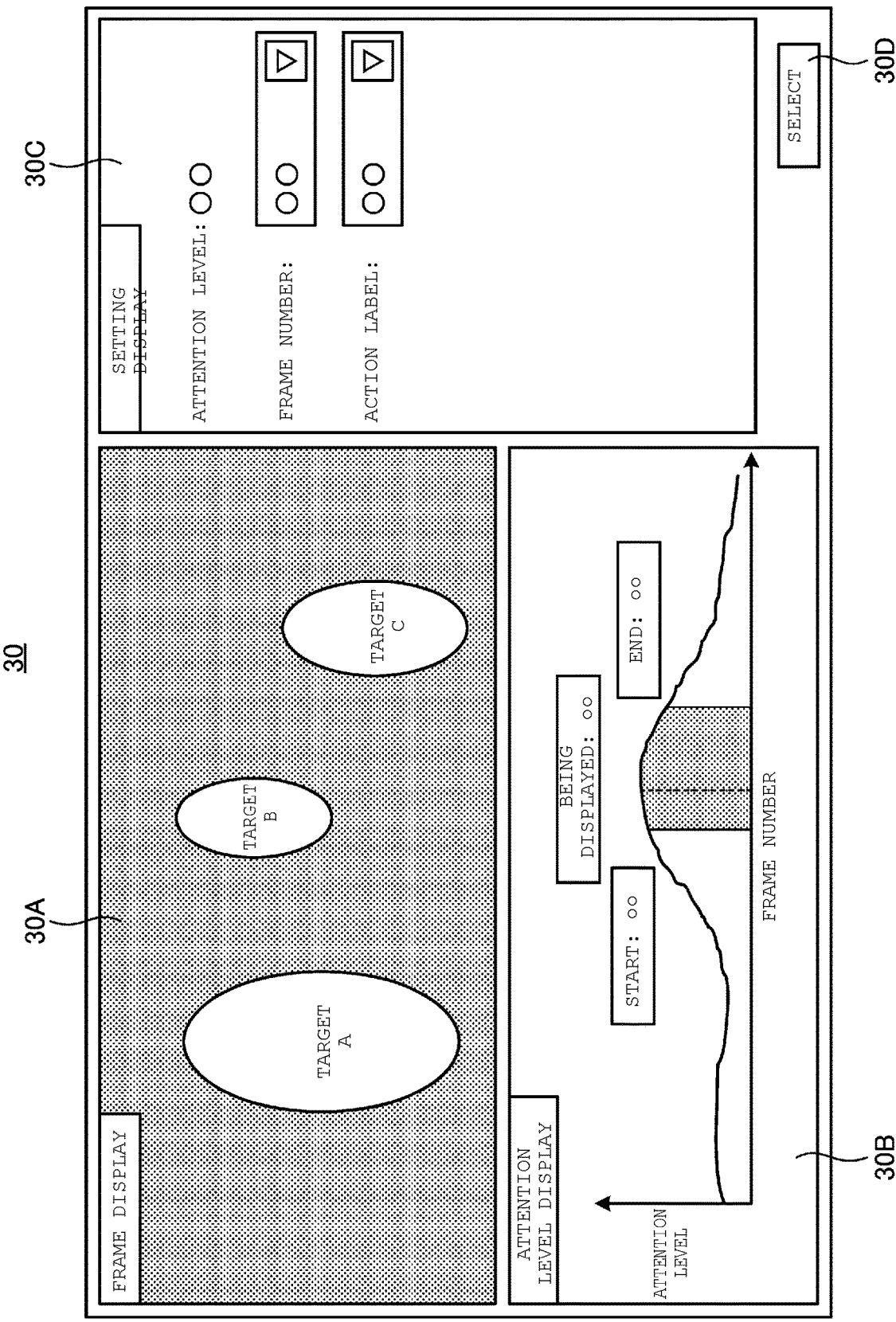
FIG. 7 is a schematic diagram showing a display screen.

FIG. 7 is a schematic diagram showing an example of a display screen 30. The display screen 30 may include, for example, a display region 30A, a display region 30B, and a setting display region 30C.

The display region 30A may be a display region for displaying a selected frame. FIG. 7 shows, as an example, an aspect in which a frame including three targets such as a target A, a target B, and a target C may be displayed in the display region 30A.

The display region 30B may be a display region for an attention level of the frame. For example, an image such as a graph representing a frame number of a frame included in sequence data acquired by the acquisition unit 12A and an attention level of the frame identified by the frame number may be displayed in the display region 30B.

The setting display region 30C may be a region for displaying a setting of the frame displayed in the display region 30A. For example, an attention level, a frame number, and an action label of the frame displayed in the display region 30A may be displayed in the setting display region 30C.

A user changes the frame number displayed in the setting display region 30C by operating the input unit 18. Through this change operation, the frame number of the frame to be displayed in the display region 30A may be set. The display control unit 24E may display an attention level of a frame with the set frame number in the setting display region 30C. The display control unit 24E may display the frame with the set frame number in the display region 30A. The display control unit 24E may display, in the display region 30B, information indicating the frame number of the frame displayed in the display region 30A. FIG. 7 shows, as an example, an aspect in which the text "being displayed" may be displayed at a position corresponding to the frame number of the frame displayed in the display region 30A.

Therefore, the user can easily check an attention level of each frame included in the sequence data by changing the setting of the frame number displayed in the setting display region 30C.

The display control unit 24E may display an action label to be added to the frame displayed in the display region 30A in the setting display region 30C in a selectable manner. For example, the display control unit 24E may display one or a plurality of action labels derived by the trained model 12B1 by using the sequence data acquired by the acquisition unit 12A in the setting display region 30C in a selectable manner. By operating the input unit 18, the user may set an action label to be added to the frame displayed in the display region 30A from the action label displayed in the setting display region 30C. The user may operate the input unit 18 to input an action label having any name to the setting display region 30C.

The user may operate the input unit 18 while referring to the attention level displayed on the display screen 30, and select a frame to be used as a learning frame. For example, the user may operate the input unit 18 to operate a selection button 30D in a state in which a frame of a target to be selected as a learning frame may be displayed in the display region 30A. Through this operation, the user may select a frame to be used as a learning frame.

Referring to FIG. 6 again, the description will be continued. The reception unit 24F may receive selection of the frame from the input unit 18. For example, the reception unit 24F may receive the frame number of the frame displayed in the display region 30A when the selection button 30D may be operated from the display control unit 24E. In this case, the reception unit 24F may further receive the action label of the frame. That is, the reception unit 24F may receive the frame number and the action label displayed in the setting display region 30C when the selection button 30D is operated by operating the input unit 18.

The selection unit 24C may select the frame received by the reception unit 24F as a learning frame. Specifically, each time the reception unit 24F receives a new frame number, the selection unit 24C may select a frame identified by the received frame number as a learning frame. Thus, the selection unit 24C may select one or a plurality of frames selected by the user according to the attention level displayed on the display unit 20 as learning frames.

In a case where the selection unit 24C receives the frame number and the action label, the selection unit 24C may select a frame identified by the frame number for which the selection may be received as a learning frame, and add the received action label to the learning frame.

The display screen 30 displayed on the display unit 20 by the display control unit 24E is not limited to the aspect shown in FIG. 7. For example, the display control unit 24E may display a plurality of frames on the display unit 20 in descending order of attention levels.

Figure 8:
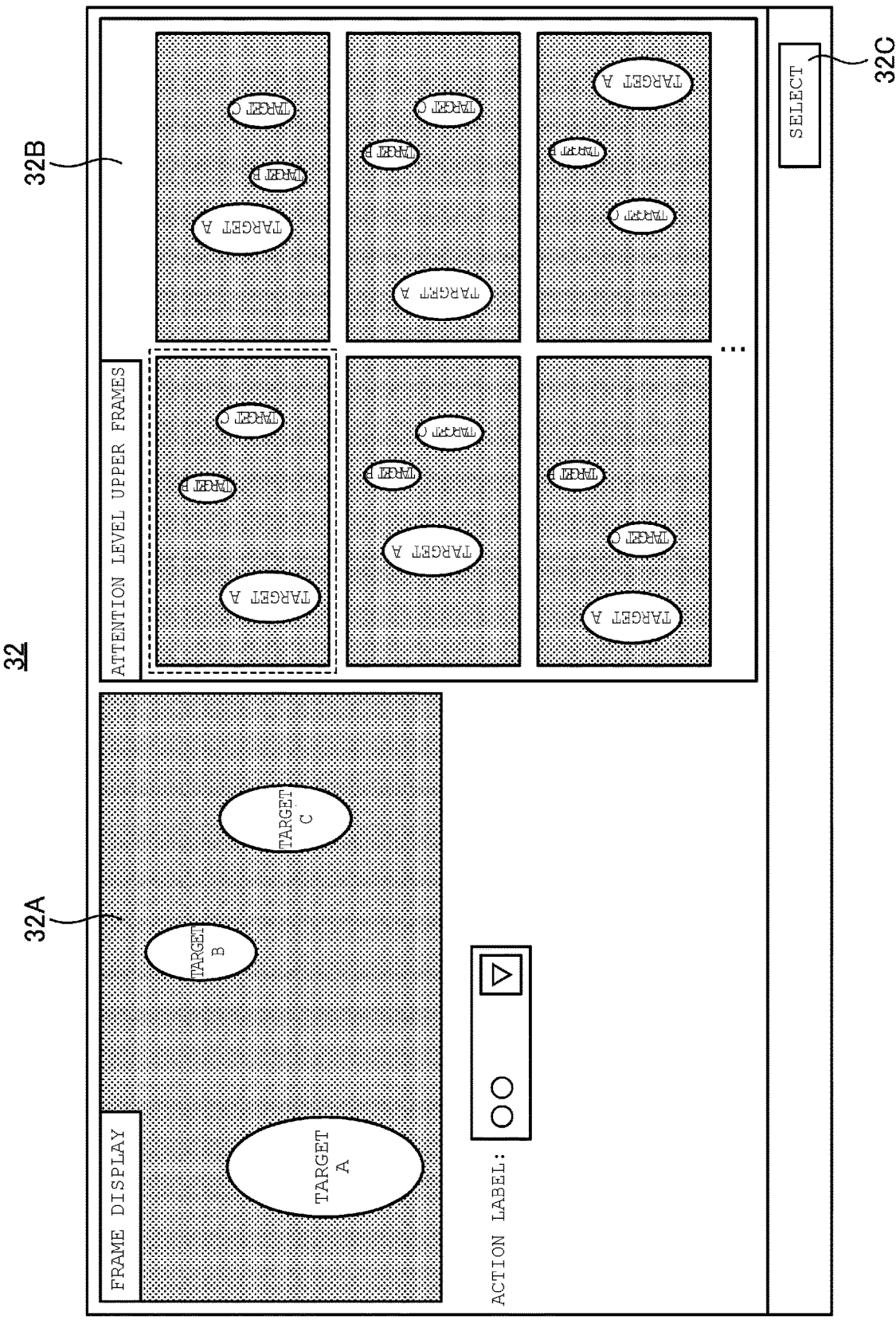
FIG. 8 is a schematic diagram showing a display screen.

FIG. 8 is a schematic diagram showing an example of a display screen 32. The display screen 32 may include, for example, a display region 32A and a display region 32B.

The display region 32A is a display region for displaying a selected frame. FIG. 8 shows, as an example, an aspect in which a frame including three targets such as a target A, a target B, and a target C may be displayed in the display region 32A. The display control unit 24E may display the background region that may be a region other than regions of the targets included in the frame, in a lighter color or higher transparency than the targets. In this case, the display control unit 24E may display the targets included in the frame in an easy-to-understand manner to a user.

The display region 32B is a display region for displaying a plurality of frames included in sequence data. The display control unit 24E may arrange the plurality of frames included in the sequence data in descending order of attention levels and display the frames in the display region 32B. By operating the input unit 18, the user may select a desired frame from among the plurality of frames displayed in the display region 32B. The display control unit 24E may display the frame selected by the user among the plurality of frames displayed in the display region 32B in the display region 32A.

The display region 32A may be provided with an action label selection region. In the same manner as in the setting display region 30C of FIG. 7, the display control unit 24E may display an action label to be added to the frame displayed in the display region 32A in a selectable manner. The user may operate the input unit 18 to input an action label having any name.

By operating the input unit 18, the user may select a frame to be used as a learning frame from among a plurality of frames arranged in descending order of attention levels and displayed in the display region 32B. Through this operation, the display control unit 24E may display the frame selected by the user among the plurality of frames displayed in the display region 32B in the display region 32A. The user may operate the input unit 18 to operate a selection button 32C in a state in which a frame of a target to be selected as a learning frame may be displayed in the display region 32A. Through this operation, the user may select a frame to be used as a learning frame.

The reception unit 24F receives selection of the frame from the input unit 18. The reception unit 24F may further receive an action label of the frame. Specifically, the reception unit 24F may receive the frame number and action label of the selected frame. The selection unit 24C may select the frame received by the reception unit 24F as a learning frame, and add the received action label thereto. Specifically, each time the reception unit 24F receives a new frame number and action label, the selection unit 24C may select a frame identified by the received frame number as a learning frame and add the action label thereto.

As described above, the display control unit 24E may arrange a plurality of frames included in the sequence data in descending order of attention levels and display the frames on the display unit 20. In this case, the user may check the attention level of each frame by checking the arrangement of the frames displayed in the display region 32B. Thus, in this case, the user can easily select a frame according to an attention level as a learning frame by checking an arrangement order of frames without checking an attention level value of the frame.

Next, an example of information processing executed by the learning data generation device 10B of the present embodiment will be described.

Figure 9:
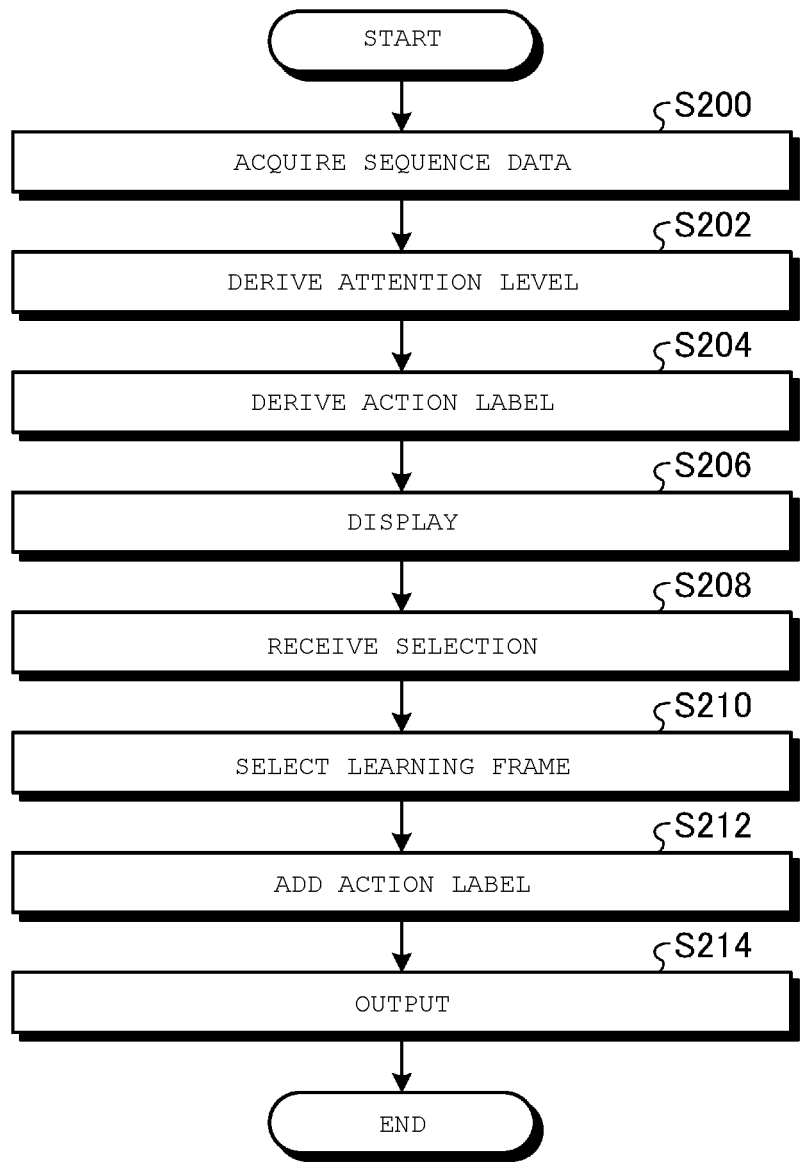
FIG. 9 is a flowchart showing information processing executed by the learning data generation device.

FIG. 9 is a flowchart showing an example of information processing executed by the learning data generation device 10B of the present embodiment.

The acquisition unit 12A acquires sequence data (step S200). The attention level derivation unit 12B may derive an attention level of each of a plurality of frames included in the sequence data acquired in step S200 by using the trained model 12B1 (step S202). The attention level derivation unit 12B may derive an action label of each of the plurality of frames included in the sequence data acquired in step S200 by using the trained model 12B1 (step S204).

The display control unit 24E may display the display screen 30 including the frame included in the sequence data acquired in step S200 and the attention level of the frame on the display unit 20 (step S206).

The reception unit 24F receives selection of a frame from the input unit 18 and the display control unit 24E (step S208). In the present embodiment, a case where selection of a frame and an action label may be received is assumed and will be described.

The selection unit 24C may select the frame received in step S208 as a learning frame (step S210). The selection unit 24C may add the action label received in step S208 to the learning frame selected in step S210 (step S212).

When selection of a plurality of frames is received, the processes in steps S208 to S212 may be repeatedly executed each time selection of a new frame is received.

The output control unit 12D outputs the learning frame selected in step S210 and the action label added in step S212 to the memory unit 16 or the like in correlation with each other (step S214). This routine is finished.

As described above, in the learning data generation device 10B of the present embodiment, the display control unit 24E may display the display screen 30 or the display screen 32 including a frame and an attention level of the frame on the display unit 20. The reception unit 24F receives selection of a frame. The selection unit 24C may select the frame received by the reception unit 24F as a learning frame.

In the learning data generation device 10B of the present embodiment, a user may select a frame to be used as a learning frame based on an attention level by referring to the frame and the attention level displayed on the display unit 20. The reception unit 24F receives the user's selection, and the selection unit 24C may select the frame received by the reception unit 24F as a learning frame.

Thus, in addition to the effects of the above embodiment, the learning data generation device 10B of the present embodiment can select a frame selected by a user according to an attention level as a learning frame.

In the learning data generation device 10B of the present embodiment, a user may select a frame to be used as a learning frame and an action label while checking the attention level displayed on the display unit 20. Therefore, the user can easily select a frame to be used as a learning frame based on an attention level that may be a value indicating the degree of importance of an action of a target included in the frame.

Third Embodiment

In the above embodiment, an aspect in which an attention level may be feature data of a frame in the time axis direction has been described as an example. However, as described above, an attention level may be feature data in the time axis direction of a target included in a frame. In the present embodiment, an aspect in which an attention level may be feature data in the time axis direction of a target included in a frame will be described as an example.

Figure 10:
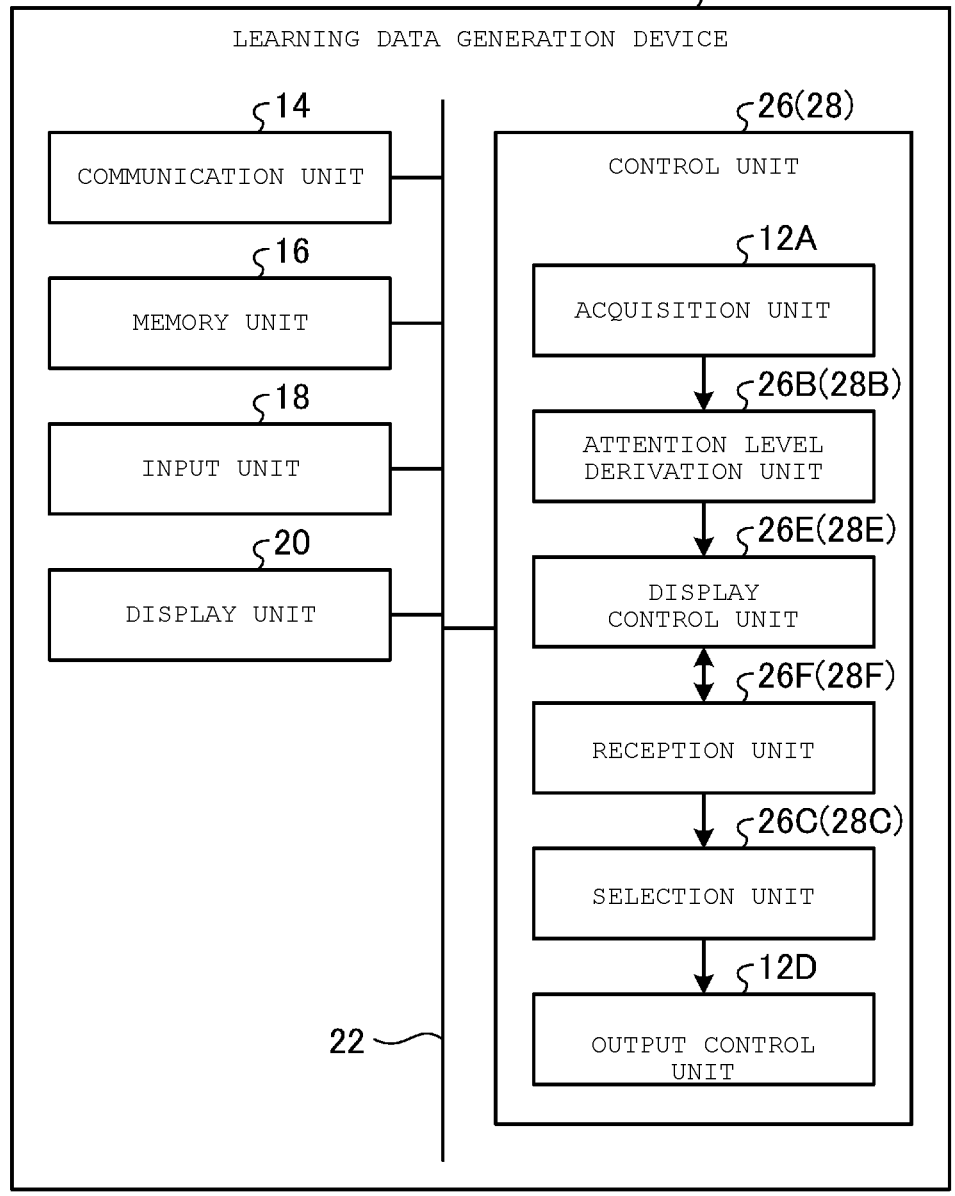
FIG. 10 is a block diagram showing the learning data generation device.

FIG. 10 is a block diagram showing an example of a learning data generation device 10C of the present embodiment. The learning data generation device 10C is an example of the learning data generation device 10.

In the learning data generation device 10C of the present embodiment, the same reference numerals are given to the same elements as those of the learning data generation device 10A or the learning data generation device 10B of the above embodiments, and detailed description thereof will be omitted.

The learning data generation device 10C may include a control unit 26, a communication unit 14, a memory unit 16, an input unit 18, and a display unit 20. The control unit 26, the communication unit 14, the memory unit 16, the input unit 18, and the display unit 20 may be communicatively connected to each other via a bus 22. The learning data generation device 10C may be the same as the learning data generation device 10A or the learning data generation device 10B except that the control unit 26 is provided instead of the control unit 12 or the control unit 24.

The control unit 26 executes various types of information processing in the learning data generation device 10C.

The control unit 26 may include an acquisition unit 12A, an attention level derivation unit 26B, a display control unit 26E, a reception unit 26F, a selection unit 26C, and an output control unit 12D. The acquisition unit 12A and the output control unit 12D may be the same as those in the above embodiment.

The attention level derivation unit 26B may use the trained model 12B1 to derive an attention level that may be feature data in the time axis direction for each of targets included in each of a plurality of frames included in sequence data.

For example, a target may appear as a single target in a sufficiently large size in an image captured by an imaging device. In this case, it may be preferable that an attention level may be feature data of the entire frame in the time axis direction. On the other hand, a plurality of targets may be included in an image, or a target may appear in a small size.

In this case, it may be preferable that the attention level may be feature data in the time axis direction for each target included in the frame. By using feature data in the time axis direction for each target, it may be possible to obtain an attention level with little influence of the background region. An attention level may be obtained in which the influence of a region other than a target has been removed. In a case where acceleration of each target is sensed, an attention level derived from the acceleration may be obtained for each target.

The attention level derivation unit 26B may select whether to derive an attention level of each frame or an attention level of each target according to a state of the target such as a size of the target or the number of the targets included in sequence data. When an attention level of each frame is derived, the attention level derivation unit 26B may execute the same process as that of the attention level derivation unit 12B of the above embodiment. In the present embodiment, an aspect in which the attention level derivation unit 26B may derive an attention level of each target included in a frame will be described.

The attention level derivation unit 26B may derive feature data of each target included in each of frames from the trained model 12B1 by inputting sequence data to the trained model 12B1. The attention level derivation unit 26B may derive a vector value in the time axis direction of the feature data of the target derived from the trained model 12B1 as an attention level of the target. The attention level derivation unit 26B may derive both an attention level of a frame and an attention level of a target included in the frame.

The display control unit 26E may display a display screen including a frame included in sequence data and an attention level of a target included in the frame on the display unit 20.

Figure 11:
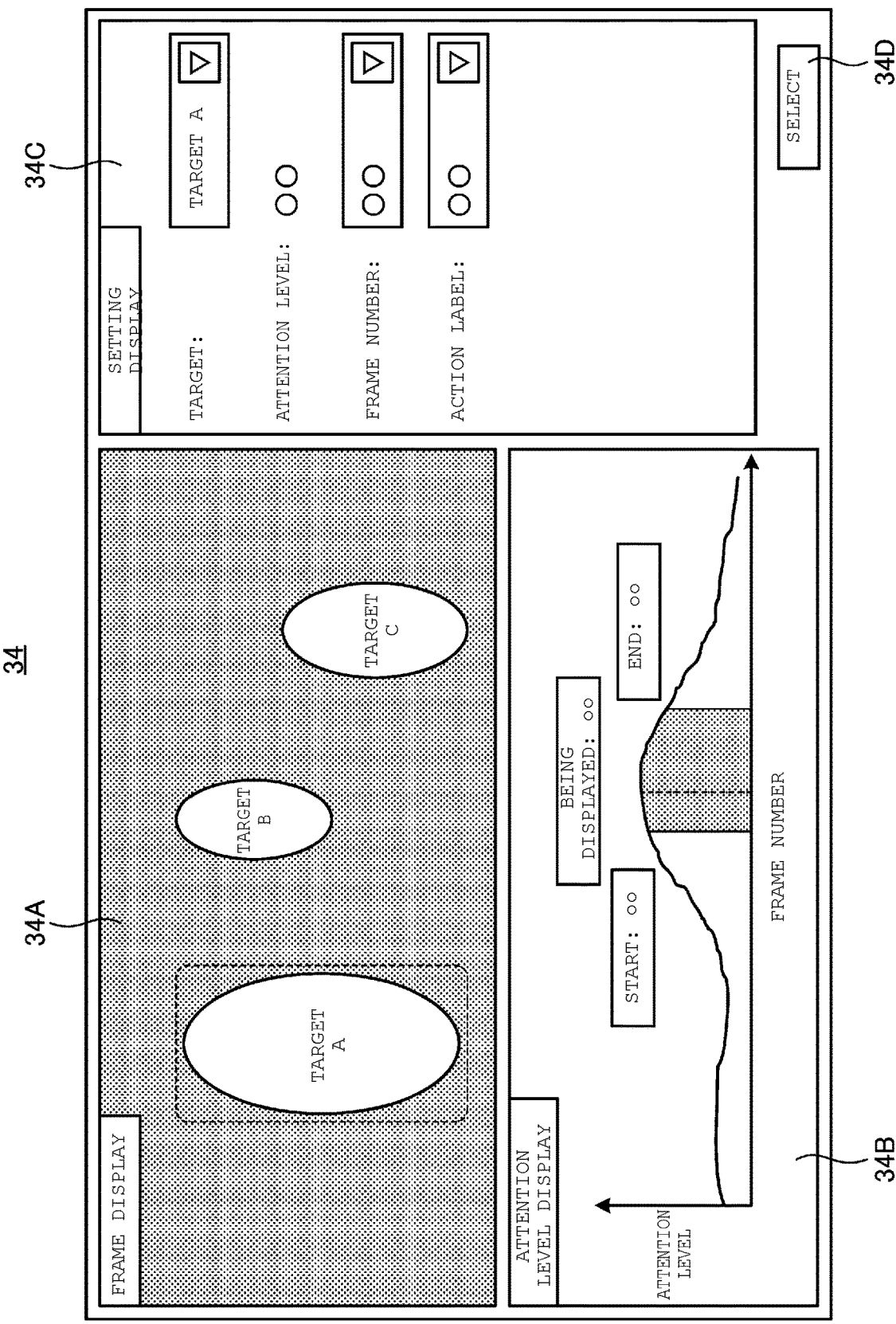
FIG. 11 is a schematic diagram showing a display screen.

FIG. 11 is a schematic diagram showing an example of the display screen 34. The display screen 34 may include, for example, a display region 34A, a display region 34B, and a setting display region 34C.

The display region 34A is a display region for displaying a selected frame. FIG. 11 shows, as an example, an aspect in which a frame including three targets such as a target A, a target B, and a target C may be displayed in the display region 34A. FIG. 11 shows a state in which the target A is selected as an example.

The display region 34B may be a display region for an attention level of a frame. For example, an image such as a graph representing a frame number of a frame included in sequence data acquired by the acquisition unit 12A and an attention level of the frame identified by the frame number may be displayed in the display region 34B. The display region 34B may be a display region for an attention level of a target included in a frame.

The setting display region 34C may be a region for displaying a setting of a target included in the frame displayed in the display region 34A. For example, a target included in the frame displayed in the display region 34A, an attention level of the target, a frame number, and an action label of the target may be displayed in the setting display region 34C.

A user changes the frame number displayed in the setting display region 34C by operating the input unit 18. Through this change operation, the frame number of the frame to be displayed in the display region 34A may be set. The display control unit 26E may display the frame with the set frame number in the display region 34A. The display control unit 26E may display information indicating which frame number the frame displayed in the display region 34A has in the display region 34B. FIG. 11 shows, as an example, an aspect in which the text "being displayed" may be displayed at a position corresponding to the frame number of the frame displayed in the display region 34A.

The user may operate the input unit 18 to change the setting of the target displayed in the setting display region 34C. Through this change operation, a target of which an attention level may be displayed is set. The display control unit 26E may display the attention level of the set target in the setting display region 34C. FIG. 11 shows, as an example, a state in which the target A is set and an attention level of the target A is displayed in the setting display region 34C.

The display control unit 26E may display an image representing the selected target in the display region 34A. FIG. 11 shows, as an example, an aspect in which a frame line surrounding the target A may be displayed in the display region 34A.

By changing the frame number displayed in the setting display region 34C and the setting of the target, the user can easily check the attention level of the set target included in the frame with the set frame number.

The display control unit 26E may display the action label to be added to the set target in the setting display region 34C in a selectable manner. For example, the display control unit 26E may display an action label of the target derived by the trained model 12B1 by using the sequence data acquired by the acquisition unit 12A in the setting display region 34C in a selectable manner. By operating the input unit 18, the user may set the action label to be added to the set target from the action label displayed in the setting display region 34C. The user may operate the input unit 18 to input an action label having any name to the setting display region 34C.

The user may operate the input unit 18 while referring to the attention level of the target displayed on the display screen 34, and select a frame to be used as a learning frame. That is, the user may check and select a frame while checking the attention level of the target displayed on the display unit 20.

For example, the user may operate the input unit 18 to operate a selection button 34D in a state in which a frame of a target to be selected as a learning frame may be displayed in the display region 34A. Through this operation, the user may select a frame to be used as a learning frame.

The display screen 34 displayed on the display unit 20 by the display control unit 26E is not limited to the aspect shown in FIG. 11. For example, the display control unit 26E may display an attention level of a target included in a frame in a graph.

Figure 12:
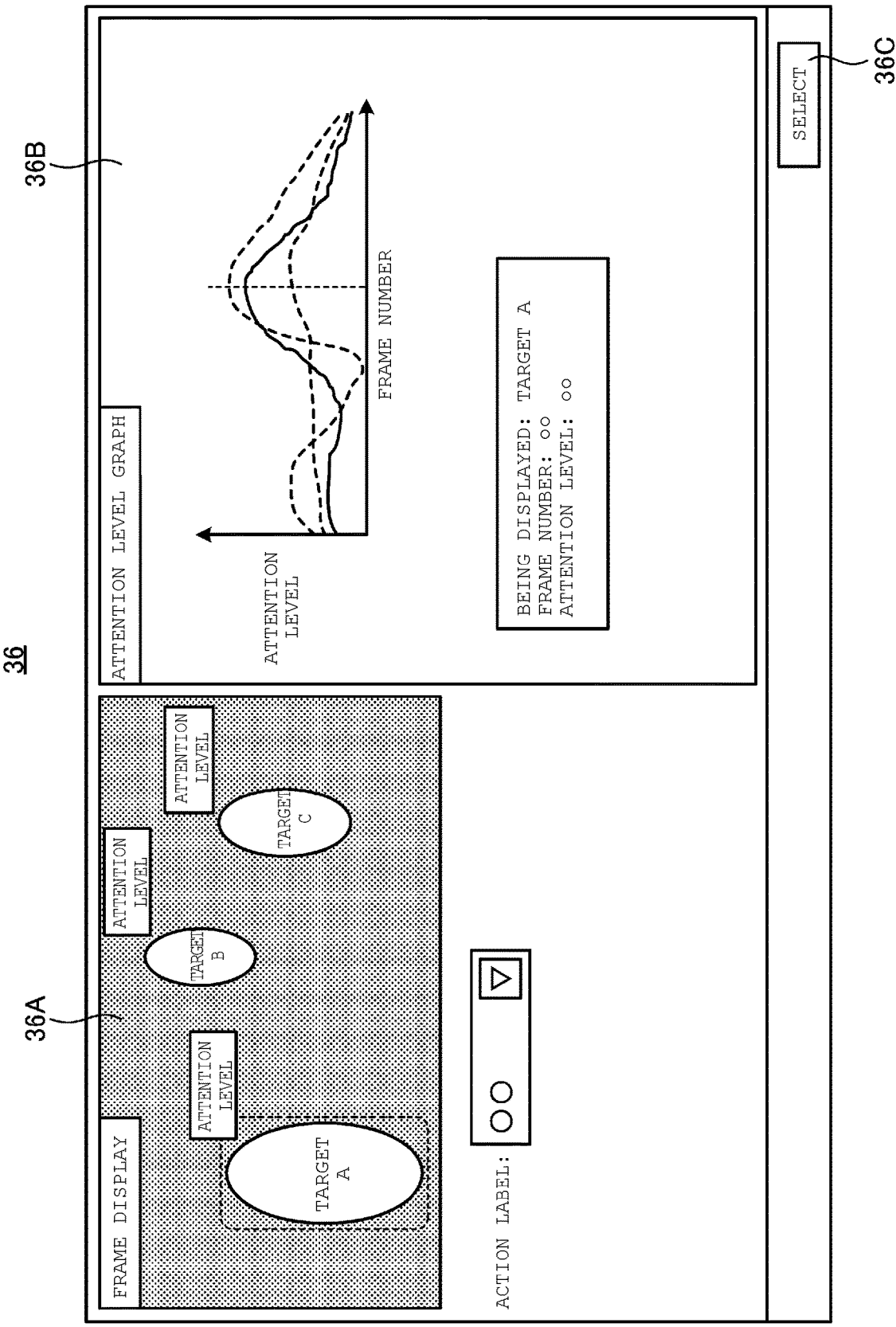
FIG. 12 is a schematic diagram showing a display screen.

FIG. 12 is a schematic diagram showing an example of a display screen 36. The display screen 36 may include, for example, a display region 36A and a display region 36B.

The display region 36A may be a display region for displaying a selected frame and an attention level of a target. FIG. 12 shows, as an example, an aspect in which a frame including three targets such as a target A, a target B, and a target C may be displayed in the display region 36A. FIG. 12 shows a state in which the target A is selected as an example. As shown in FIG. 12, an attention level of the target may be displayed in each of display regions of the targets included in the display region 36A.

The display region 36B may be a display region for an attention level of a target. For example, an image such as a graph representing a frame number of a frame included in the sequence data acquired by the acquisition unit 12A and an attention level of a selected target included in the frame identified by the frame number may be displayed in the display region 36B. FIG. 12 shows a state in which the target A may be selected and an attention level of the target A may be displayed as an example.

FIG. 12 shows a case where a plurality of targets are included in one frame as an example. FIG. 12 shows an example in which the display control unit 26E displays a graph representing an attention level of each of the plurality of targets in the display region 36B, and displays an attention level of the selected target with a solid line. The display region 36B may be in a form of displaying a graph representing an attention level of one selected target. When a plurality of targets are included in one frame, the display control unit 26E may display a graph representing an average value of attention levels of the plurality of targets or a total value of these attention levels in the display region 36B.

The user may operate the input unit 18 to change the frame number and the target displayed in the display region 36B. Through this change operation, the frame number of the frame to be displayed in the display region 36A may be set. The display control unit 26E may display the frame with the set frame number in the display region 34A. In this case, the display control unit 26E may display the attention level of each of the targets included in the frame in the display region 36A.

The user may operate the input unit 18 while referring to the attention level of the target displayed on the display screen 36, and select a frame to be used as a learning frame. For example, the user may operate the input unit 18 to operate a selection button 36C in a state in which a frame of a target to be selected as a learning frame may be displayed in the display region 36A. Through this operation, the user may select a frame to be used as a learning frame.

Therefore, by visually recognizing the display screen 36, the user may easily check a frame including a target having a high attention level while checking the attention level of the target. The user may select a frame to be used as a learning frame while checking the attention level of the target displayed on the display unit 20.

A frame including a target having a high attention level is likely to be a frame in which some event has occurred. Thus, the display control unit 26E may provide the frame in which some event is likely to have occurred to a user in an easily specifiable manner by displaying the attention level of the target. By selecting such a frame as a learning frame, the learning data generation device 10C can provide a learning frame applicable to monitoring work.

The display control unit 26E may display a display screen including a frame, an attention level of a target included in the frame, and action magnitude information of the target on the display unit 20.

The action magnitude information of the target may be information indicating a magnitude of an action of the target included in the frame. As the action magnitude information of the target, for example, an optical flow calculated from frames at two different times or an amount of change in coordinates of skeleton information at two different times may be used. The action magnitude information of the target may be calculated by the attention level derivation unit 26B.

By displaying the attention level of the target and the action magnitude information of the target on the display unit 20, the user may select a frame to be used as a learning frame in consideration of the action magnitude and the attention level of the target. By visually recognizing the action magnitude information of the target, the user can easily find a frame including the target having a large action, that is, a frame in which some event has occurred.

The display control unit 26E may display an attention level for each action label. The display control unit 26E may calculate and display an attention level for each action label by using a technique such as Grad-CAM for calculating an attention level corresponding to a class label.

Figure 13:
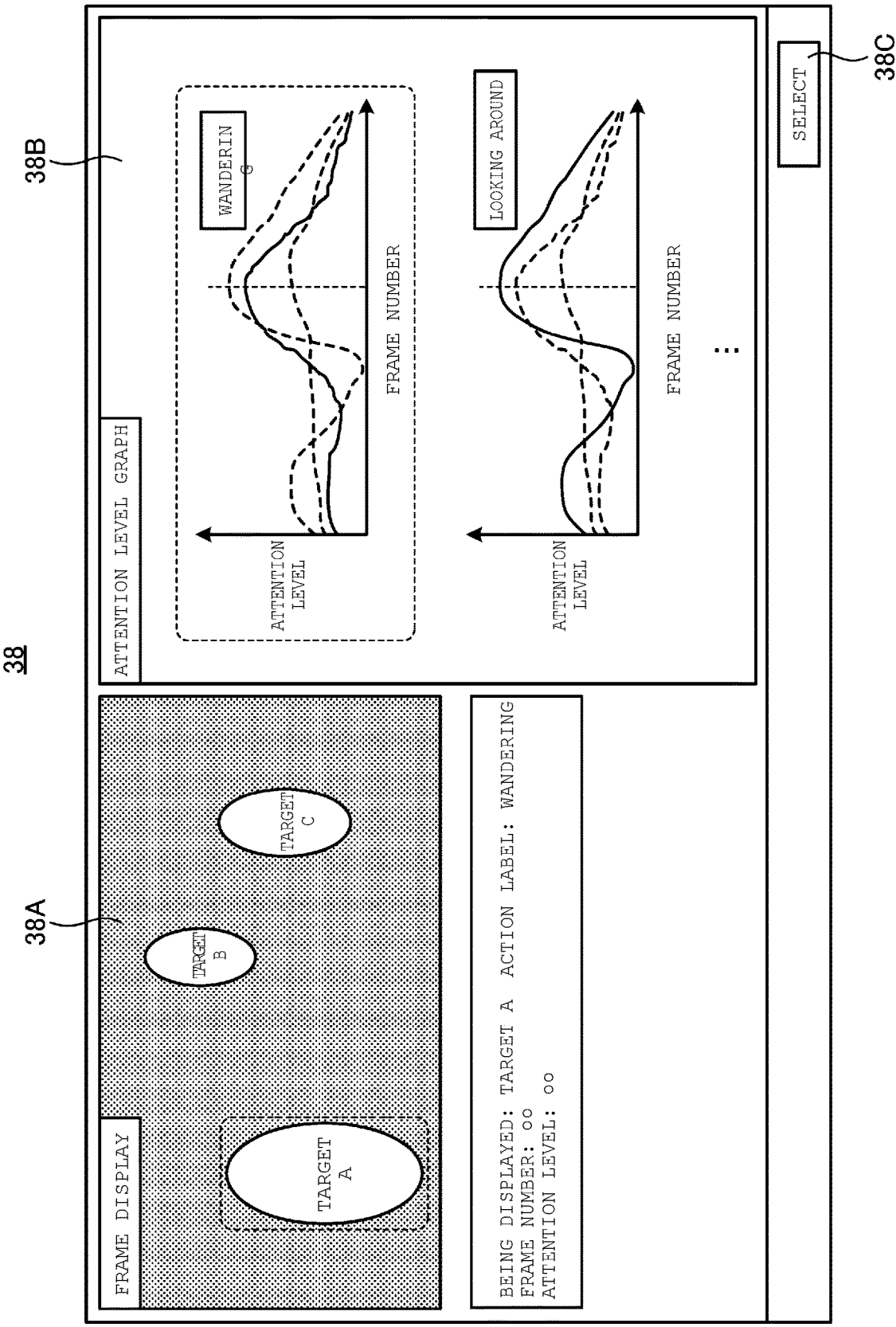
FIG. 13 is a schematic diagram showing a display screen.

FIG. 13 is a schematic diagram showing an example of a display screen 38. The display screen 38 may include, for example, a display region 38A and a display region 38B.

The display region 38A may be a display region for displaying the selected frame and the attention level of the target. FIG. 13 shows, as an example, an aspect in which a frame including three targets such as a target A, a target B, and a target C may be displayed in the display region 38A. FIG. 13 shows a state in which the target A may be selected as an example. In the display region 38A, the selected target A, an action label added to the target A, a frame number of a frame displayed in the display region 38A, and an attention level of the target A may be displayed.

The display region 38B may be a display region for an attention level for each action label. For example, an image such as a graph representing a frame number of a frame included in sequence data acquired by the acquisition unit 12A and an attention level for an action label of a target included in the frame identified by the frame number for each action label may be displayed in the display region 38B. A case where the graph of an attention level for each of the action labels such as "wandering" and "looking around" may be displayed in the display region 38B in FIG. 13 is shown as an example.

A user may select a frame to be used as a learning frame by operating the input unit 18 while referring to the attention level for each action label displayed on the display screen 38. For example, the user may operate the input unit 18 to operate a selection button 38C in a state in which a frame of a target to be used as a learning frame may be displayed in the display region 38A. Through this operation, the user may select a frame to be used as a learning frame.

Thus, by visually recognizing the display screen 38, the user can select a frame to be used as a learning frame and an action label while checking the attention level for each action label. That is, the user can easily check a frame in which some event is likely to have occurred and an action label indicating an event that has occurred.

Next, an example of information processing executed by the learning data generation device 10C of the present embodiment will be described.

FIG. 14 is a flowchart showing an example of information processing executed by the learning data generation device 10C of the present embodiment.

The acquisition unit 12A acquires sequence data (step S300). The attention level derivation unit 26B may use the trained model 12B1 to derive an attention level of each target included in each of a plurality of frames included in the sequence data acquired in step S300 (step S302). The attention level derivation unit 12B may derive an action label of each target included in each of the plurality of frames included in the sequence data acquired in step S300 by using the trained model 12B1 (step S304).

The display control unit 26E may display the display screen 34 including the frame included in the sequence data acquired in step S300 and the attention level of the target included in the frame on the display unit 20 (step S306). The display control unit 26E may display the display screen 36 or the display screen 38 on the display unit 20. Here, a description will be continued assuming a scene in which the display screen 34 may be displayed on the display unit 20.

The reception unit 26F receives selection of a frame from the input unit 18 and the display control unit 26E (step S308). In the present embodiment, a case where selection of a frame and an action label of a target included in the frame is received is assumed and will be described.

The selection unit 26C may select the frame received in step S308 as a learning frame (step S310). The selection unit 26C may add the action label received in step S308 to the target included in the learning frame selected in step S310 (step S312).

The output control unit 12D outputs the learning frame selected in step S310 and the action label added to the target included in the learning frame in step S312 to the memory unit 16 or the like in correlation with each other (step S314). This routine is finished.

As described above, in the learning data generation device 10C of the present embodiment, the attention level derivation unit 26B may derive an attention level of each target included in each of a plurality of frames included in sequence data by using the trained model 26B1. The display control unit 26E may display a display screen including a frame and an attention level of a target included in the frame on the display unit 20.

A frame including a target having a high attention level is likely to be a frame in which some event has occurred. Therefore, the learning data generation device 10C of the present embodiment can provide the frame in which some event is likely to have occurred to a user in an easily specifiable manner by displaying the attention level of the target. By selecting such a frame as a learning frame, the learning data generation device 10C can provide a learning frame applicable to monitoring work.

Fourth Embodiment

In the present embodiment, an aspect in which an image of an action label is displayed on the display unit 20 will be described.

FIG. 10 is a block diagram showing an example of a learning data generation device 10D of the present embodiment. The learning data generation device 10D is an example of the learning data generation device 10.

In the learning data generation device 10D of the present embodiment, the same reference numerals are given to the same elements as those of the learning data generation device 10A, the learning data generation device 10B, or the learning data generation device 10C of the above embodiments, and detailed description thereof will be omitted.

The learning data generation device 10D may include a control unit 28, a communication unit 14, a memory unit 16, an input unit 18, and a display unit 20. The control unit 28, the communication unit 14, the memory unit 16, the input unit 18, and the display unit 20 may be communicatively connected to each other via a bus 22. The learning data generation device 10D may be the same as the learning data generation device 10A, the learning data generation device 10B, or the learning data generation device 10C except that the control unit 28 may be provided instead of the control unit 12, the control unit 24, or the control unit 26.

The control unit 28 executes various types of information processing in the learning data generation device 10D.

The control unit 28 may include an acquisition unit 12A, an attention level derivation unit 28B, a display control unit 28E, a reception unit 28F, a selection unit 28C, and an output control unit 12D. The acquisition unit 12A and the output control unit 12D may be the same as those in the above embodiment.

The attention level derivation unit 28B may use the trained model 12B1 to derive an attention level that may be feature data in the time axis direction of each of targets included in each of a plurality of frames included in sequence data. The attention level derivation unit 28B may derive an attention level of each target in the same manner as the attention level derivation unit 26B of the above embodiment.

In the present embodiment, the attention level derivation unit 28B may further derive an image of the action label as the action label for each target. The image of the action label may be a still image or a moving image of the target to which the action label may be added. For example, the image of the action label may be an image of a frame including a target to which the action label may be added, an image obtained by extracting a target region of a target included in the image of the frame, or the like.

The attention level derivation unit 28B may use the trained model 12B1 to derive feature data of each target included in a frame and an action label of each target for each of a plurality of frames included in sequence data. The attention level derivation unit 28B may register a frame ID of the frame, a target ID, the feature data, the action label, and the image of the action label in an action label database (DB) in correlation with each other. The frame ID may be identification information of the frame. As the frame ID, for example, the above-described frame number may be used. The target ID may be identification information that identifies the target. As described above, the image of the action label may be, for example, an image of a frame identified by a corresponding frame ID.

FIG. 15 is a schematic diagram showing an example of the data structure of the action label DB. The attention level derivation unit 28B may register a frame ID, a target ID, feature data of a target, an action label of the target, and an image of the action label of the target in the action label DB in correlation with each other. The action label DB may be stored in the memory unit 16, for example.

Referring to FIG. 10 again, the description will be continued. The display control unit 28E may display a display screen including a frame included in sequence data and an image of an action label of a target included in the frame on the display unit 20.

Figure 16:
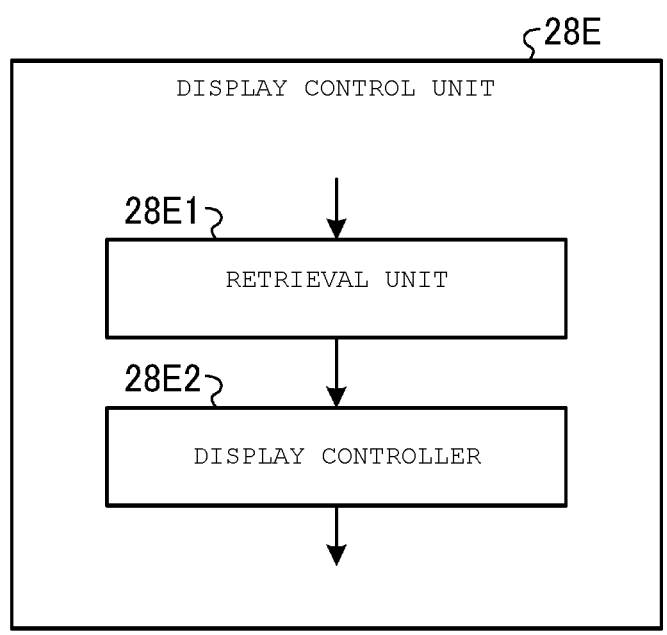
FIG. 16 is a block diagram showing a functional configuration of a display control unit.

FIG. 16 is a block diagram showing an example of a functional configuration of the display control unit 28E. The display control unit 28E may include a retrieval unit 28E1 and a display controller 28E2.

The retrieval unit 28E1 may specify feature data of a target included in each of frames included in sequence data. The retrieval unit 28E1 may specify feature data of a target included in a learning frame selected by the selection unit 28C by an operation instruction given by a user to the input unit 18. In the present embodiment, an aspect in which the retrieval unit 28E1 specifies feature data of a target included in a learning frame selected by the selection unit 28C will be described as an example. The retrieval unit 28E1 may specify the feature data of the target by acquiring the feature data of the target included in the selected learning frame from the attention level derivation unit 28B.

The retrieval unit 28E1 may retrieve stored feature data similar to the specified feature data from the action label DB. The stored feature data may be feature data registered in the action label DB. The display control unit 28E may retrieve the stored feature data similar to the feature data of the target included in the learning frame from the action label DB, and thus retrieve a similar action similar to an action of the target included in the learning frame.

For example, the retrieval unit 28E1 may retrieve similar stored feature data from the action label DB based on a nearest neighbor search using a distance evaluation such as a cosine similarity between the feature data and the stored feature data.

The retrieval unit 28E1 may specify an image of an action label corresponding to the retrieved stored feature data from the action label DB. That is, the retrieval unit 28E1 may retrieve an image of an action label added to a similar action similar to a target included in the learning frame from the action label DB. The display control unit 28E may display the learning frame and the image of the action label corresponding to the stored feature data similar to the feature data of the target included in the learning frame on the display unit 20. That is, the display control unit 28E may display the learning frame and the image of the action label added to the similar action similar to the target included in the learning frame on the display unit 20.

Figure 17:
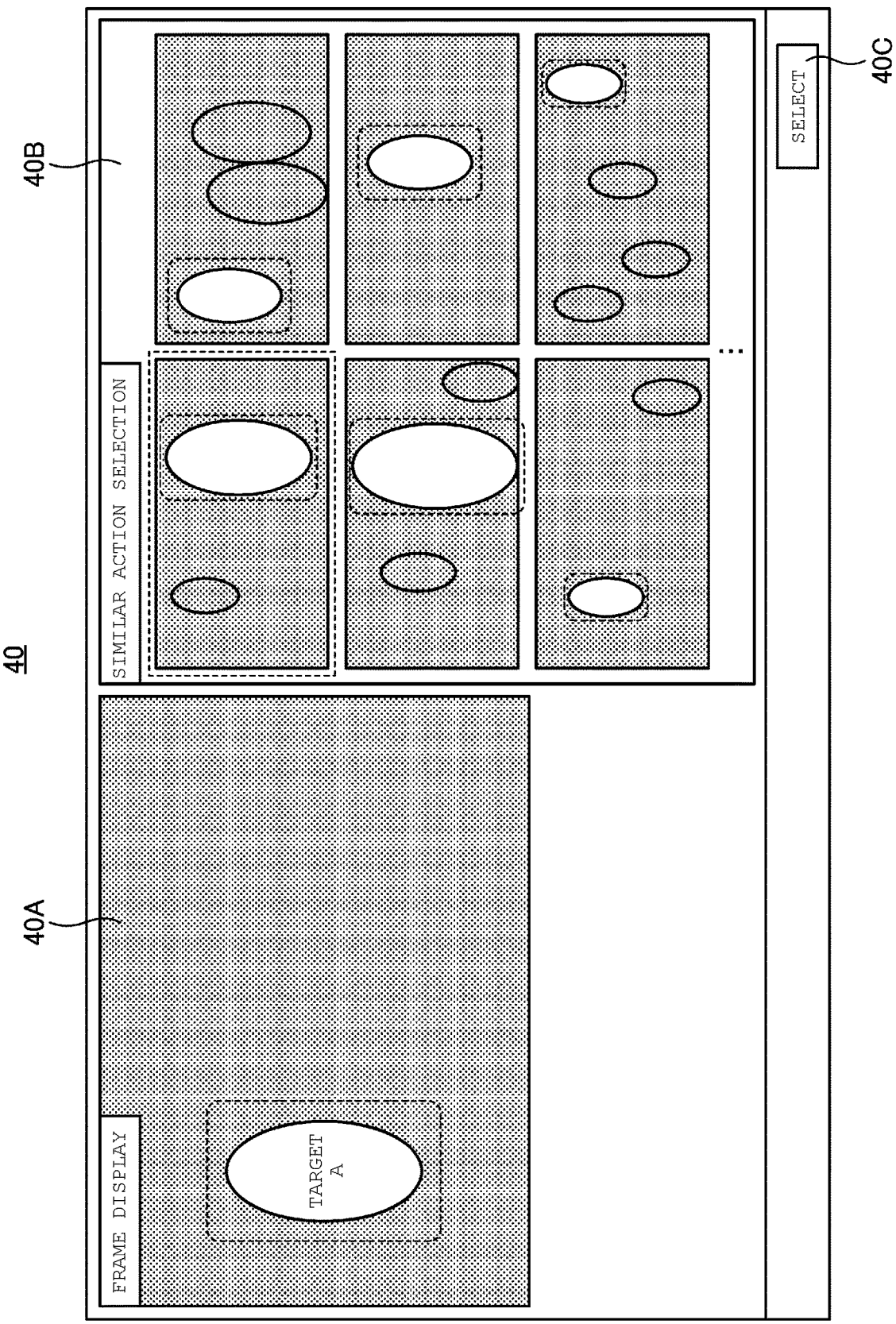
FIG. 17 is a schematic diagram showing a display screen.

FIG. 17 is a schematic diagram showing an example of a display screen 40 displayed on the display unit 20 by the display control unit 28E.

The display screen 40 may include a display region 40A and a display region 40B. The display region 40A may be a display region for displaying a selected learning frame. FIG. 17 shows, as an example, an aspect in which a learning frame including the target A may be displayed in the display region 40A. FIG. 17 shows a state in which the target A is selected as an example.

The display region 40B may be a display region for displaying a list of images of action labels.

The display control unit 28E may display a learning frame selected by an operation instruction given by a user to the input unit 18 in the display region 40A, and display a list of images of action labels added to similar actions similar to a target included in the learning frame in the display region 40B. For example, the display control unit 28E may display a list of images of action labels in the display region 40B in descending order of similarity of feature data.

When an image of a specific action label is selected by an operation instruction given by a user to the input unit 18, the display control unit 28E may further display detailed information regarding the image of the selected action label. The detailed information may be, for example, information indicating details of the action label. The image of the action label displayed in the display region 40A may include an image other than an image of the target in the similar action. In this case, the display control unit 28E may display a region other than a region of the target in the similar action included in the image of the action label in a lighter color or higher transparency than that of the target in the similar action. In this case, the display control unit 28E can prevent selection of an image with an erroneous action label.

By operating the input unit 18, the user may select an image of the action label to be added to the target included in the learning frame displayed in the display region 40A from the list of images of the action labels. A case may be assumed in which one action label image may be selected from the list of images of action labels displayed in the display region 40B and a selection button 40C may be operated. The reception unit 28F may receive the image of the action label.

Referring to FIG. 10 again, the description will be continued. The selection unit 28C may add an action label corresponding to the image of the action label received by the reception unit 28F to the selected learning frame. The selection unit 28C may acquire the action label corresponding to the image of the action label received by the reception unit 28F from the action label DB and add the action label to the learning frame.

Next, an example of information processing executed by the learning data generation device 10D of the present embodiment will be described.

Figure 18:
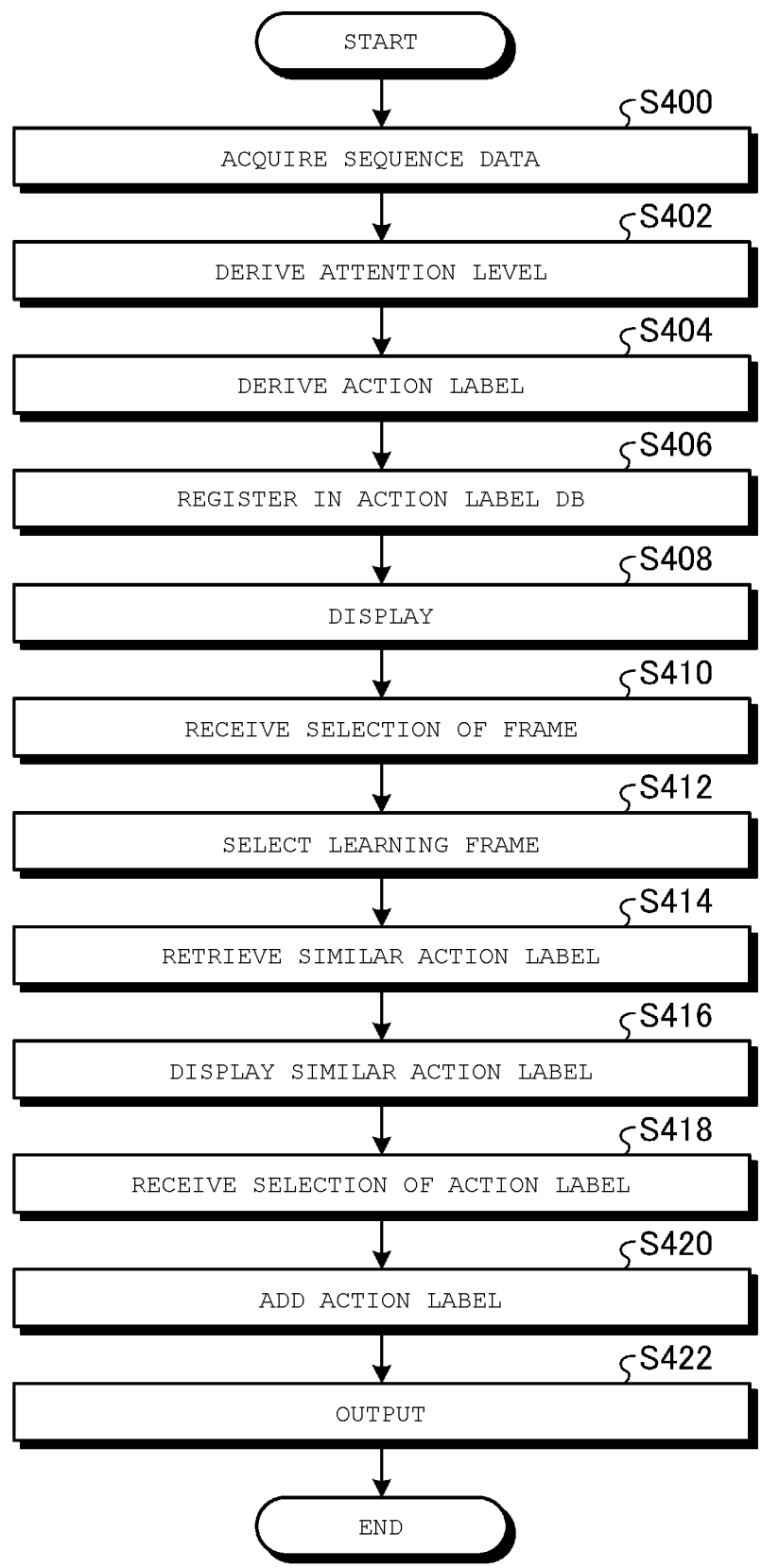
FIG. 18 is a flowchart showing information processing executed by the learning data generation device.

FIG. 18 is a flowchart showing an example of information processing executed by the learning data generation device 10D of the present embodiment.

The acquisition unit 12A acquires sequence data (step S400). The attention level derivation unit 28B may use the trained model 12B1 to derive an attention level of each target included in each of a plurality of frames included in the sequence data acquired in step S400 (step S402). The attention level derivation unit 12B may use the trained model 12B1 to derive an action label and an image of the action label of each target included in each of the plurality of frames included in the sequence data acquired in step S400 (step S404).

The attention level derivation unit 12B may register the frame ID of the frame used for deriving the attention level in step S402, the target ID, the feature data, the action label, and the image of the action label in the action label DB in correlation with each other (step S406).

The display control unit 28E may display a display screen including the frame included in the sequence data acquired in step S400 and the attention level of the target included in the frame on the display unit 20 (step S408).

The reception unit 28F may receive selection of a frame to be used as a learning frame selected by an operation instruction given by a user to the input unit 18 (step S410). The selection unit 28C may select the frame received in step S410 as a learning frame (step S412).

The retrieval unit 28E1 of the display control unit 28E may retrieve an image of an action label corresponding to stored feature data similar to the feature data of the target included in the learning frame selected in step S412 from the action label DB (step S414). That is, the retrieval unit 28E1 may retrieve an image of an action label added to a similar action similar to a target included in the learning frame from the action label DB.

The display control unit 28E may display the learning frame selected in step S412 and the image of the action label retrieved in step S414 on the display unit 20 (step S416). That is, the display control unit 28E may display the learning frame and the image of the action label added to the similar action similar to the target included in the learning frame on the display unit 20.

The reception unit 28F may receive selection of the image of the selected action label from the images of the action labels displayed in step S416 (step S418). The reception unit 28F may add the action label corresponding to the image of the action label received in step S418 to the learning frame selected in step S412 (step S420).

In a case where selection of a plurality of learning frames may be received, the processes in steps S410 to S420 may be repeatedly executed each time selection of one learning frame is received.

The output control unit 12D outputs the learning frame selected in step S412 and the action label added to the target included in the learning frame in step S420 to the memory unit 16 or the like in correlation with each other (step S422). This routine is finished.

As described above, the learning data generation device 10D of the present embodiment may display the display screen 40 including a frame and an image of an action label corresponding to stored feature data similar to feature data of a target included in the frame on the display unit 20.

Actions of a target include actions or motions that may be difficult to express in language. Definition of words on an action label may be ambiguous. Thus, when text representing the action label may be displayed in a selectable manner, it may be difficult for a user to select the action label to be added to a target. On the other hand, in the present embodiment, the display control unit 28E may display a list of images of action labels to be added to the target included in the learning frame on the display unit 20. Thus, by visually checking the image of the action label, the user can easily specify an image of an action label representing a similar action visually similar to the target to which the action label may be added. That is, the user can easily designate the action label.

Therefore, in addition to the above effects, the learning data generation device 10D of the present embodiment can easily provide an action label to be added to a target included in a learning frame in a selectable manner.

Next, an example of a hardware configuration of the learning data generation device 10A, the learning data generation device 10B, the learning data generation device 10C, and the learning data generation device 10D of the above embodiments will be described.

Figure 19:
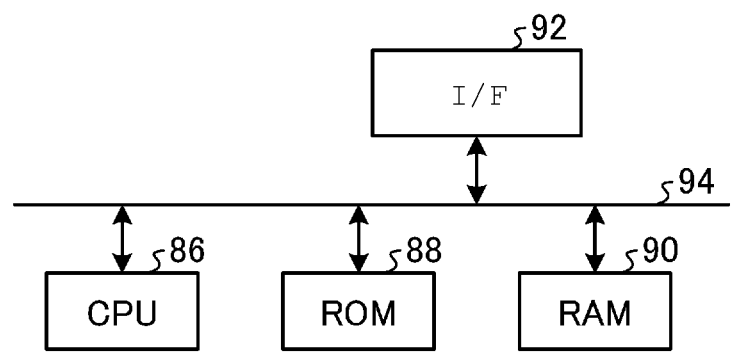
FIG. 19 is a hardware configuration diagram.

FIG. 19 is a diagram showing an example of a hardware configuration of the learning data generation device 10A, the learning data generation device 10B, the learning data generation device 10C, and the learning data generation device 10D of the above embodiments.

The learning data generation device 10A, the learning data generation device 10B, the learning data generation device 10C, and the learning data generation device 10D of the above embodiments include a central processing unit (CPU) 86, a read only memory (ROM) 88, and a random access memory (RAM) 90, an interface (I/F) 92, and the like connected to each other via a bus 94, and have a hardware configuration using a normal computer.

The CPU 86 may be a calculation unit that controls the learning data generation device 10A, the learning data generation device 10B, the learning data generation device 10C, and the learning data generation device 10D according to the above embodiments. The ROM 88 may store a program or the like that implements information processing executed by the CPU 86. The RAM 90 may store data necessary for various processes of the CPU 86. The I/F 92 may be an interface connected to the communication unit 14, the memory unit 16, the input unit 18, the display unit 20, and the like to perform data communication.

In the learning data generation device 10A, the learning data generation device 10B, the learning data generation device 10C, and the learning data generation device 10D of the above embodiments, the CPU 86 may read a program from the ROM 88 onto the RAM 90 and executes the program, and thus the respective functions are implemented by a computer.

A program for executing each of the above processes executed by the learning data generation device 10A, the learning data generation device 10B, the learning data generation device 10C, and the learning data generation device 10D of the above embodiments may be stored in a hard disk drive (HDD). A program for executing each of the above processes executed by the learning data generation device 10A, the learning data generation device 10B, the learning data generation device 10C, and the learning data generation device 10D of the above embodiments may be preliminarily incorporated in the ROM 88 and provided.

A program for executing the above processes executed by the learning data generation device 10A, the learning data generation device 10B, the learning data generation device 10C, and the learning data generation device 10D of the above embodiments may be stored in a computer readable storage medium such as a CD-ROM, a CD-R, a memory card, a digital versatile disk (DVD), or a flexible disk (FD) in a file in an installable format or in an executable format and provided as a computer program product. A program for executing the above information processing executed by the learning data generation device 10A, the learning data generation device 10B, the learning data generation device 10C, and the learning data generation device 10D of the above embodiments may be stored on a computer connected to a network such as the Internet, and downloaded via the network to be provided. A program for executing the above information processing executed by the learning data generation device 10A, the learning data generation device 10B, the learning data generation device 10C, and the learning data generation device 10D of the above embodiments may be provided or distributed via a network such as the Internet.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A learning data generation device comprising:
   a processor programmed to function as:
      an acquisition unit that acquires sequence data including a plurality of frames that include a target and are consecutive in a sequence;
      an attention level derivation unit that derives an attention level comprising feature data in a time axis direction of each of the plurality of frames included in the sequence data by using a trained model; and
      a selection unit that selects one or a plurality of frames included in the sequence data as a learning frame to be used for learning data based on the attention level.

2. The learning data generation device according to claim 1, wherein
   the selection unit selects the one or plurality of frames included in the sequence data as the learning frame based on at least one of a magnitude of the attention level and an amount of change in the attention level between the frames consecutive in the sequence.

3. The learning data generation device according to claim 2, wherein
   the selection unit selects, as the learning frame, a frame from among a set of frames comprising at least one of:
      a predetermined number of frames in descending order of the magnitude of the attention level,
      a predefined ratio of frames in descending order of the magnitude of the attention level,
      frames in a period from a change point at the beginning of an increase in the attention level to a change point at the end of a decrease in the attention level,
      frames in which the amount of change in the attention level is equal to or more than a threshold value, or a frame having a highest attention level and a predetermined number of frames consecutive to the frame having the highest attention level in the sequence.

4. The learning data generation device according to claim 1, wherein
the selection unit adds an action label corresponding to the learning frame, derived from the trained model, to the learning frame.

5. The learning data generation device according to claim 1, wherein
the trained model is a learning model that has been trained in advance by using the sequence data or other sequence data different from the sequence data.

6. The learning data generation device according to claim 1, wherein the processor is further programmed to function as:
a display control unit that displays a display screen including a frame and the attention level of the frame on a display unit; and
a reception unit that receives selection of the frame, wherein
the selection unit selects the received frame as the learning frame.

7. The learning data generation device according to claim 6, wherein
the reception unit receives input of an action label to be added to the frame, and
the selection unit adds the action label for which the input is received to the frame of which the selection is received.

8. The learning data generation device according to claim 6, wherein
the attention level derivation unit derives the attention level that is feature data in the time axis direction of each target included in each of the plurality of frames included in the sequence data by using the trained model.

9. The learning data generation device according to claim 8, wherein
the display control unit displays the display screen including the frame and the attention level of the target included in the frame on the display unit.

10. The learning data generation device according to claim 8, wherein
the display control unit displays the display screen including the frame, the attention level of the target included in the frame, and magnitude information of an action of the target on the display unit.

11. The learning data generation device according to claim 8, wherein
the display control unit displays the display screen including the frame and an image of an action label corresponding to stored feature data that is stored in advance similar to feature data of the target included in the frame on the display unit.

12. The learning data generation device according to claim 1, wherein the processor is further programmed to function as:
an output control unit that outputs the learning frame.

13. The learning data generation device according to claim 12, wherein
the output control unit outputs the learning frame and at least one of the action label and additional information derived from the learning frame in correlation with each other.

14. The learning data generation device according to claim 1, wherein
the sequence data is at least one of:
sequence data of an image,
sequence data of a target region of a target included in the image,
sequence data of skeleton information indicating a joint position of the target, and
sequence data of acceleration of the target.

15. The learning data generation device according to claim 1, wherein
the target is a moving object.

16. A learning data generation method comprising:
acquiring sequence data including a plurality of frames that include a target and are consecutive in a sequence;
deriving an attention level comprising feature data in a time axis direction of each of the plurality of frames included in the sequence data by using a trained model; and
selecting one or a plurality of frames included in the sequence data as a learning frame to be used for learning data based on the attention level.

17. A non-transitory computer readable medium storing a learning data generation program causing a computer to execute a learning data generation method comprising:
acquiring sequence data including a plurality of frames that include a target and are consecutive in a sequence;
deriving an attention level comprising feature data in a time axis direction of each of the plurality of frames included in the sequence data by using a trained model; and
selecting one or a plurality of frames included in the sequence data as a learning frame to be used for learning data based on the attention level.

* * * * *